United States Patent
Lee et al.

(10) Patent No.: US 8,304,136 B2
(45) Date of Patent: Nov. 6, 2012

(54) SOLID OXIDE FUEL CELL AND SOLID OXIDE FUEL CELL BUNDLE

(75) Inventors: Eon Soo Lee, Gyeongsangbuk-do (KR); Jae Hyuk Jang, Gyunggi-do (KR); Jae Hyoung Gil, Seoul (KR); Kyong Bok Min, Gyunggi-do (KR); Sung Han Kim, Seoul (KR); Hong Ryul Lee, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 387 days.

(21) Appl. No.: 12/611,840

(22) Filed: Nov. 3, 2009

(65) Prior Publication Data

US 2011/0059388 A1 Mar. 10, 2011

(30) Foreign Application Priority Data

Sep. 10, 2009 (KR) ................ 10-2009-0085540
Sep. 14, 2009 (KR) ................ 10-2009-0086620

(51) Int. Cl.
*H01M 8/10* (2006.01)
*H01M 8/24* (2006.01)

(52) U.S. Cl. ........ 429/497; 429/452; 429/463; 429/465; 429/467; 429/468; 429/471; 429/479; 429/507; 429/508

(58) Field of Classification Search .............. None
See application file for complete search history.

(56) References Cited

U.S. PATENT DOCUMENTS

| | | | | |
|---|---|---|---|---|
| 4,476,198 A * | 10/1984 | Ackerman et al. | ........ | 429/456 |
| 4,749,632 A * | 6/1988 | Flandermeyer et al. | ...... | 429/468 |
| 4,833,045 A * | 5/1989 | Pollack et al. | ........ | 429/468 |
| 5,173,372 A * | 12/1992 | Matsuo et al. | ........ | 429/496 |
| 5,273,838 A * | 12/1993 | Draper et al. | ........ | 429/466 |
| 5,750,278 A * | 5/1998 | Gillett et al. | ........ | 429/436 |
| 6,423,436 B1 * | 7/2002 | George et al. | ........ | 429/456 |
| 6,767,662 B2 * | 7/2004 | Jacobson et al. | ........ | 429/479 |
| 6,844,100 B2 * | 1/2005 | Bourgeois et al. | ........ | 429/435 |
| 6,849,353 B2 * | 2/2005 | Vora et al. | ........ | 429/497 |
| 2004/0241527 A1 * | 12/2004 | Champion et al. | ........ | 429/40 |
| 2005/0208356 A1 * | 9/2005 | Amino | ........ | 429/31 |
| 2006/0134489 A1 * | 6/2006 | Sarkar et al. | ........ | 429/31 |
| 2006/0147778 A1 * | 7/2006 | Matsuzaki et al. | ........ | 429/32 |
| 2006/0153974 A1 * | 7/2006 | Matsuzaki et al. | ........ | 427/115 |
| 2007/0141442 A1 * | 6/2007 | Schlerf | ........ | 429/38 |
| 2007/0196704 A1 * | 8/2007 | Valensa et al. | ........ | 429/20 |
| 2008/0063916 A1 * | 3/2008 | Hawkes et al. | ........ | 429/32 |
| 2008/0085439 A1 * | 4/2008 | Hilliard | ........ | 429/30 |
| 2010/0009228 A1 * | 1/2010 | Zafred et al. | ........ | 429/27 |
| 2010/0173213 A1 * | 7/2010 | Lange et al. | ........ | 429/436 |
| 2011/0053045 A1 * | 3/2011 | Kim et al. | ........ | 429/497 |

* cited by examiner

*Primary Examiner* — Jeffrey Wollschlager
(74) *Attorney, Agent, or Firm* — Blakely Sokoloff Taylor & Zafman LLP

(57) ABSTRACT

Disclosed is a solid oxide fuel cell bundle, including a plurality of fuel cells each having a polygonal tubular support an outer surface of which has a plurality of planes, an outer connector formed on one plane among the plurality of planes of the tubular support, a plurality of unit cells respectively formed on two or more remaining planes of the tubular support except for the one plane, and inner connectors for connecting the unit cells and the outer connector in series, wherein the fuel cells is connected in series in such a manner that the outer connector of a fuel cell is bonded to the unit cell of an additional fuel cell, and the unit cells are connected in series, thus exhibiting excellent cell performance and high power density per unit volume, and maintaining high voltage upon collection of current to thereby reduce power loss due to electrical resistance.

17 Claims, 15 Drawing Sheets

SOLID OXIDE FUEL CELL AND SOLID OXIDE FUEL CELL BUNDLE

CROSS REFERENCE TO RELATED APPLICATIONS

This application claims the benefit of Korean Patent Application No. 10-2009-0085540, filed Sep. 10, 2009, entitled "Solid oxide fuel cell and solid oxide fuel cell bundle", and Korean Patent Application No. 10-2009-0086620, filed Sep. 14, 2009, entitled "Solid oxide fuel cell bundle", which are hereby incorporated by reference in their entirety into this application.

BACKGROUND OF THE INVENTION

1. Technical Field

The present invention relates to a solid oxide fuel cell (SOFC) and an SOFC bundle.

2. Description of the Related Art

A fuel cell is a device for directly converting the chemical energy of fuel (hydrogen, LNG, LPG, etc.) and air into electric power and heat using an electrochemical reaction. Unlike conventional techniques for generating power including combusting fuel, generating steam, driving a turbine and driving a power generator, the fuel cell neither undergoes a combustion procedure nor requires an operator and is thus regarded as a novel power generation technique which results in high cell performance without being accompanied by any concomitant environmental problems. The fuel cell discharges very small amounts of air pollutants such as SOx and NOx and also generates a small amount of carbon dioxide and is thus a pollution-free power generator, and is furthermore advantageous in terms of producing very little noise and not causing any vibrations.

The fuel cell includes for example a phosphoric acid fuel cell (PAFC), an alkaline fuel cell (AFC), a polymer electrolyte membrane fuel cell (PEMFC), a direct methanol fuel cell (DMFC), a solid oxide fuel cell (SOFC) and so on. In particular, the SOFC exhibits high power generation efficiency because of low overvoltage based on activation polarization and low irreversible loss. Furthermore, the SOFC is advantageous because various types of fuel, such as hydrogen, carbon and a hydrocarbon, may be used, and also because the reaction rate at the electrodes is high, thus obviating a need to use an expensive noble metal as an electrode catalyst. Moreover, the temperature of the heat generated during power generation is very high, and thus the heat is very usable. In addition, heat generated from the SOFC is used to reform fuel and may also be utilized as an energy source for industrial purposes or for air cooling in a cogeneration system. Hence, the SOFC is essential for realizing the hydrogen-based society of the future.

In accordance with the operating principle of the SOFC, the SOFC typically generates power through the oxidation of hydrogen or carbon monoxide, and the reactions at the anode and cathode are represented by Reaction 1 below.

Reaction 1

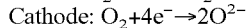
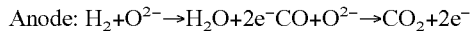
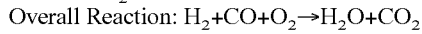

Anode: $H_2 + O^{2-} \rightarrow H_2O + 2e^-$  $CO + O^{2-} \rightarrow CO_2 + 2e^-$
Cathode: $O_2 + 4e^- \rightarrow 2O^{2-}$
Overall Reaction: $H_2 + CO + O_2 \rightarrow H_2O + CO_2$ In the above reactions, electrons are delivered to the cathode through an external circuit, and simultaneously the oxygen ion generated at the cathode is transferred to the anode through an electrolyte. At the anode, hydrogen or carbon monoxide is combined with the oxygen ion, thus producing electrons and water or carbon dioxide.

FIGS. 1A and 1B are perspective views showing conventional SOFCs.

As shown in FIGS. 1A and 1B, examples of the SOFCs include a planar SOFC 10 and a tubular SOFC 20.

The planar SOFC 10 is configured such that a separator 11, a unit cell 13 and a separator 11 are sequentially layered. The planar SOFC 10 has superior cell performance, higher power density and a simpler manufacturing process compared to the tubular SOFC 20. In particular, the planar SOFC is advantageous because electrodes and an electrolyte are formed on a plane through tape casting, doctor blade coating, screen printing or the like, thus resulting in low manufacturing cost.

However, the planar SOFC 10 needs a large external manifold for supplying and discharging reactive gas, and also, the structure thereof is required to be subjected to to absolutely hermetic gas sealing. To this end, a sealing member 15 for gas sealing should be disposed between the separator 11 and the unit cell 13. However, the sealing member 15 has low durability at high temperature and may undesirably cause cracking. Furthermore, although a gas sealing process using mechanical compression, cement, glass and a combination of glass and cement is being developed, there still occur many problems. In the case of mechanical compression conducted for sealing purposes, a ceramic element may undergo non-uniform stress undesirably incurring cracking. In the case of cement or glass, it may react with a material for a fuel cell at high temperature, and thus may negatively affect the fuel cell.

On the other hand, the tubular SOFC 20 is configured such that an electrolyte 23 and an anode 25 are sequentially layered on the outer surface of a cathode support 21, and a connector 27 for connecting a unit cell to another unit cell is formed on the upper portion of the cathode support 21. The tubular SOFC 20 obviates a need for additional gas sealing and therefore exhibits long-term durability and is stable under thermal impact, unlike the planar SOFC 10.

However, the tubular SOFC 20 which is in cylindrical form makes it difficult to perform a stacking process so that when unit cells are connected and thus a bundle thereof is formed, they have a large volume, resulting in comparatively low performance and power density. Also, because the outer surface of the cathode support 21 is curved, it is difficult to uniformly apply the electrodes and electrolyte, compared to the planar SOFC 10.

SUMMARY OF THE INVENTION

Accordingly, the present invention has been made keeping in mind the problems encountered in the related art and the present invention is intended to provide an SOFC to having a polygonal tubular support the outer surface of which has a plurality of planes thus eliminating a need for gas sealing and exhibiting high performance, and also to provide an SOFC bundle using the SOFC to thus manifest an optimal power density.

An aspect of the present invention provides an SOFC, including a polygonal tubular support an outer surface of which has a plurality of planes, an outer connector formed on one plane of the tubular support among the plurality of planes of the tubular support, a plurality of unit cells respectively formed on two or more remaining planes of the tubular support except for the one plane of the tubular support, and inner connectors for connecting the plurality of unit cells and the outer connector in series.

In this aspect, each of the plurality of unit cells may include a first electrode, an electrolyte and a second electrode formed in sequential order on the two or more remaining planes of the tubular support except for edges of the tubular support, and the inner connectors may be formed at remaining edges of the tubular support except for an edge of the tubular support between one end of the outer connector and one end of the unit cell adjacent to the one end of the outer connector, so as to connect one end of the first electrode and one end of the second electrode adjacent to the one end of the first electrode to each other, and the one end of the first electrode and the other end of the outer connector to each other.

In this aspect, in order to cover a lateral surface of the other end of the first electrode, an end of the electrolyte corresponding thereto may extend toward the tubular support, and the one end of the second electrode may extend toward the tubular support so that the extending end of the electrolyte is covered therewith.

In this aspect, each of the inner connectors may be isolated from the other end of the second electrode.

In this aspect, the first electrode may be an anode, and the second electrode may be a cathode.

In this aspect, the first electrode may be a cathode, and the second electrode may be an anode.

In this aspect, the tubular support may be formed of a material being porous and having insulating properties.

In this aspect, the tubular support may be formed of an alumina-based ceramic material.

Another aspect of the present invention provides an SOFC bundle, including a plurality of fuel cells, each of which comprises a polygonal tubular support an outer surface of which has a plurality of planes, an outer connector formed on one plane of the tubular support among the plurality of planes of the tubular support, a plurality of unit cells respectively formed on two or more remaining planes of the tubular support except for the one plane of the tubular support, and inner connectors for connecting the plurality of unit cells and the outer connector in series, wherein the plurality of fuel cells is connected in series in a manner such that the outer connector of a fuel cell is bonded to the unit cell of an additional fuel cell.

In this aspect, each of the plurality of unit cells may include a first electrode, an electrolyte and a second electrode formed in sequential order on the two or more remaining planes the tubular support except for edges of the tubular support, and the inner connectors may be formed at remaining edges of the tubular support except for an edge of the tubular support between one end of the outer connector and one end of the unit cell adjacent to the one end of the outer connector, so as to connect one end of the first electrode and one end of the second electrode adjacent to the one end of the first electrode to each other, and the one end of the first electrode and the other end of the outer connector to each other.

In this aspect, in order to cover a lateral surface of the other end of the first electrode, an end of the electrolyte corresponding thereto may extend toward the tubular support, and the one end of the second electrode may extend toward the tubular support so that the extending end of the electrolyte is covered therewith.

In this aspect, each of the inner connectors may be isolated from the other end of the second electrode.

In this aspect, the first electrode may be an anode, and the second electrode may be a cathode.

In this aspect, the first electrode may be a cathode, and the second electrode may be an anode.

In this aspect, the tubular support may be a hexagonal tubular support an outer surface of which has six planes, the plurality of unit cells may be respectively formed on five remaining planes of the tubular support, and the plurality of fuel cells may include a plurality of first fuel cells each of which has an outer connector formed in a counterclockwise direction of the edge of the tubular support and a plurality of second fuel cells each of which has an outer connector formed in a clockwise direction of the edge of the tubular support, and the plurality of fuel cells may be stacked in two layers by continuously performing bonding between the outer connector of a first fuel cell and the unit cell formed in a counterclockwise direction of the edge of a second fuel cell and bonding between the outer connector of the second fuel cell and the unit cell formed in a clockwise direction of the edge of an additional first fuel cell.

In this aspect, the tubular support may be a triangular tubular support an outer surface of which has three planes, the plurality of unit cells may be respectively formed on two remaining planes of the tubular support, and the plurality of fuel cells may include a plurality of first fuel cells each of which has an outer connector formed in a counterclockwise direction of the edge of the tubular support and a plurality of second fuel cells each of which has an outer connector formed in a clockwise direction of the edge of the tubular support, and the plurality of fuel cells may be stacked in one layer by continuously performing bonding between the outer connector of a first fuel cell and the unit cell formed in a counterclockwise direction of the edge of a second fuel cell and bonding between the outer connector of the second fuel cell and the unit cell formed in a clockwise direction of the edge of an additional first fuel cell.

In this aspect, the tubular support may have an outer surface having N planes in which N is an even number of 6 or more, the outer connector may be formed on one plane of the tubular support among the N planes of the tubular support, $(N+2)/2$ unit cells may be respectively formed on $(N+2)/2$ remaining planes of the tubular support continuously arranged in one direction from the one plane of the tubular support, the inner connectors may be used so as to connect the unit cells and the outer connector in series, N fuel cells each of which comprises the tubular support, the outer connector and the inner connectors may be provided, and bonding between the outer connector of a fuel cell and the unit cell formed on a $[(N+2)/2]^{th}$ remaining plane in one direction from one plane of an additional fuel cell may be continuously performed N−1 times so that the N fuel cells are connected in series, in order to form a tubular hollow defined by the N fuel cells.

In this aspect, each of the $(N+2)/2$ unit cells may include a first electrode, an electrolyte and a second electrode formed in sequential order on the $(N+2)/2$ remaining planes of the tubular support except for edges of the tubular support, and the inner connectors may be used to connect one end of the first electrode and one end of the second electrode adjacent to the one end of the first electrode, which are formed at both sides of each of edges of the tubular support between the $(N+2)/2$ remaining planes on which the unit cells are formed, to each other, and to connect the one end of the first electrode to one end of the outer connector adjacent to the one end of the first electrode, which are formed at both sides of the edge of the tubular support between the one plane of the tubular support and the remaining plane adjacent to the one plane in one direction, to each other.

In this aspect, the outer connector of the fuel cell may be bonded to the unit cell of the additional fuel cell using metal foam, metal felt or metal paste.

In this aspect, angles between the planes forming the edges of the tubular support may be equal to each other.

BRIEF DESCRIPTION OF THE DRAWINGS

The features and advantages of the present invention will be more clearly understood from the following detailed description taken in conjunction with the accompanying drawings, in which.

DESCRIPTION OF SPECIFIC EMBODIMENTS

Figure 1A:
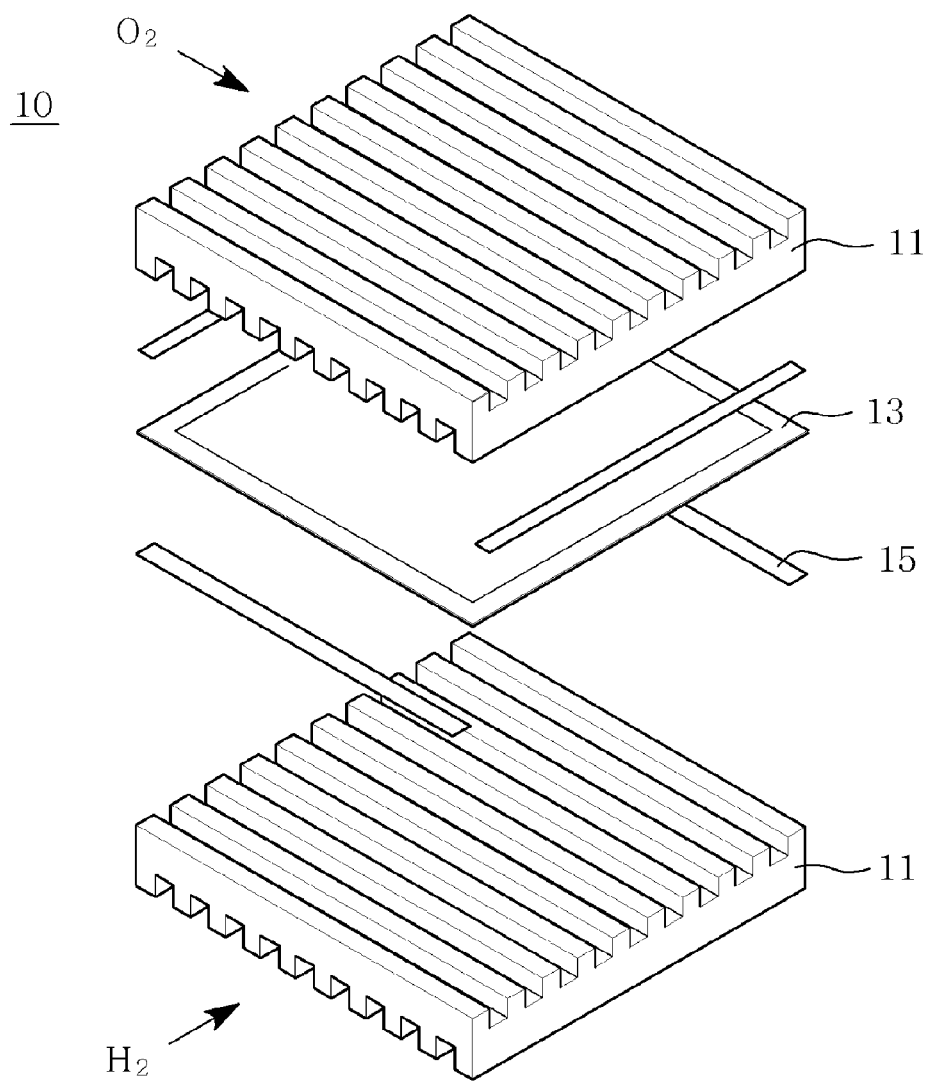
FIGS. 1A and 1B are perspective views showing conventional SOFCs.
Figure 1B:
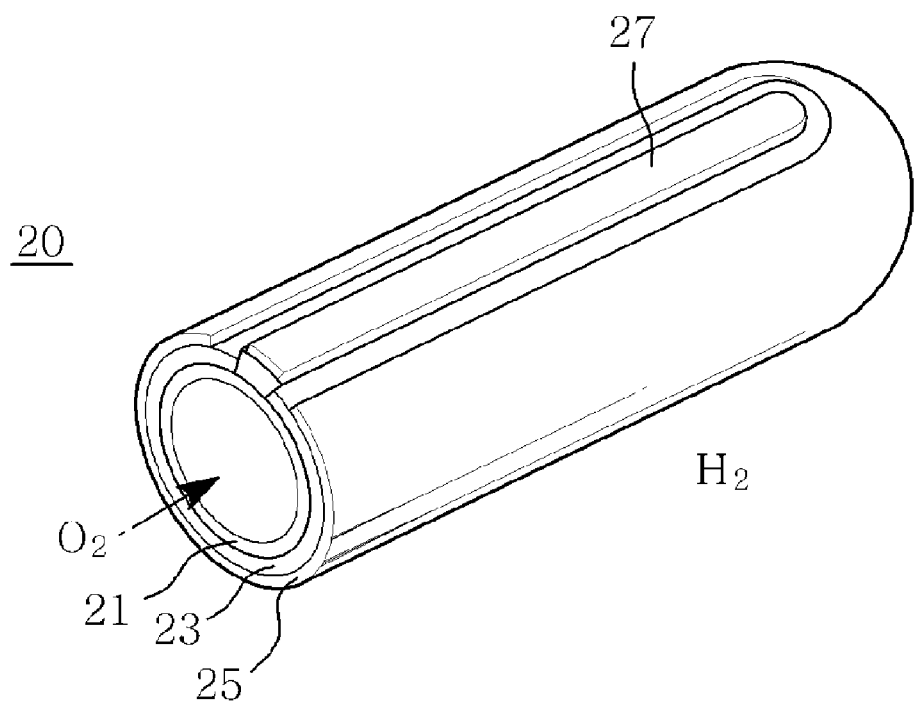

Hereinafter, a detailed description will be given of embodiments of the present invention with reference to the accompanying drawings. Throughout the drawings, the same reference numerals refer to the same or similar elements, and redundant descriptions are omitted. Also in the drawings, $O_2$ and $H_2$ are used merely for purposes of illustration to specify the operative procedure of a fuel cell but the type of gas supplied to an anode or a cathode is not restricted. In the description, the terms "one end", "the other end", "the lateral surface of the other end", "one edge", "first", "second", "outer" and so on are used only to distinguish one element from another element, and the elements are not defined by the above terms. Also in the description, in the case where known techniques pertaining to the present invention are regarded as unnecessary because they would make the characteristics of the invention unclear and also for the sake of description, the detailed descriptions thereof may be omitted.

Furthermore, the terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept implied by the term to best describe the method he or she knows for carrying out the invention.

Figure 2:
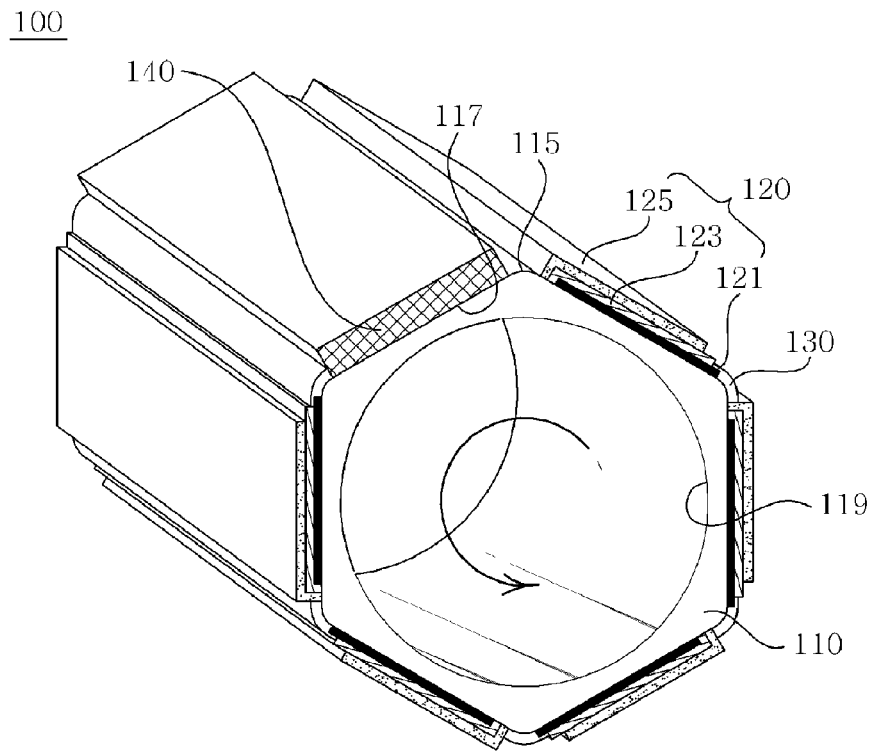
FIGS. 2 to 5 are perspective views showing SOFCs according to a first embodiment of the present invention.
Figure 3:
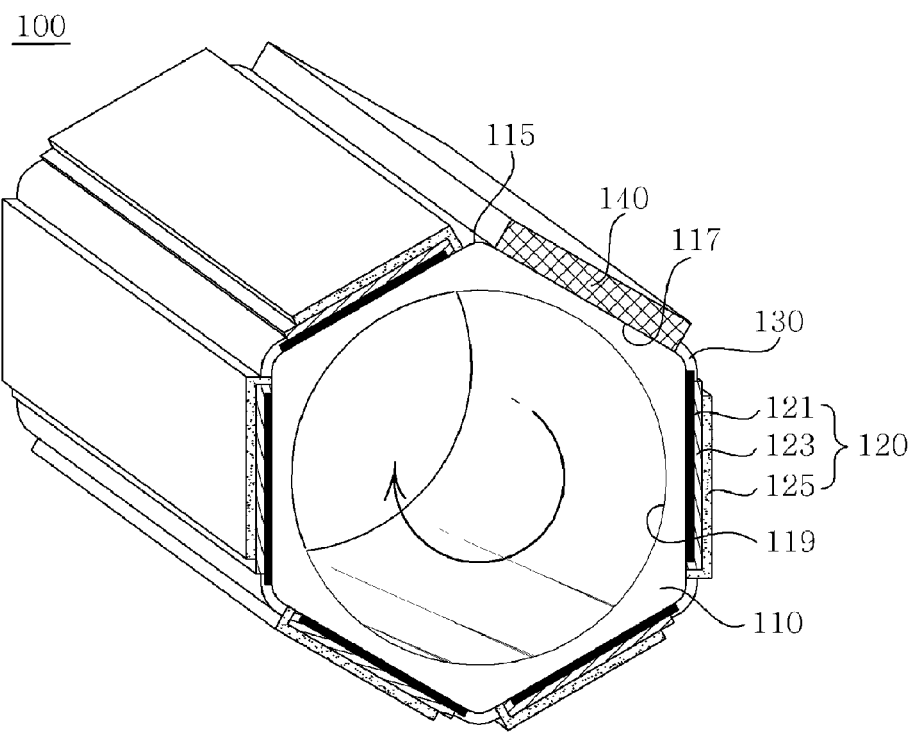
Figure 4:
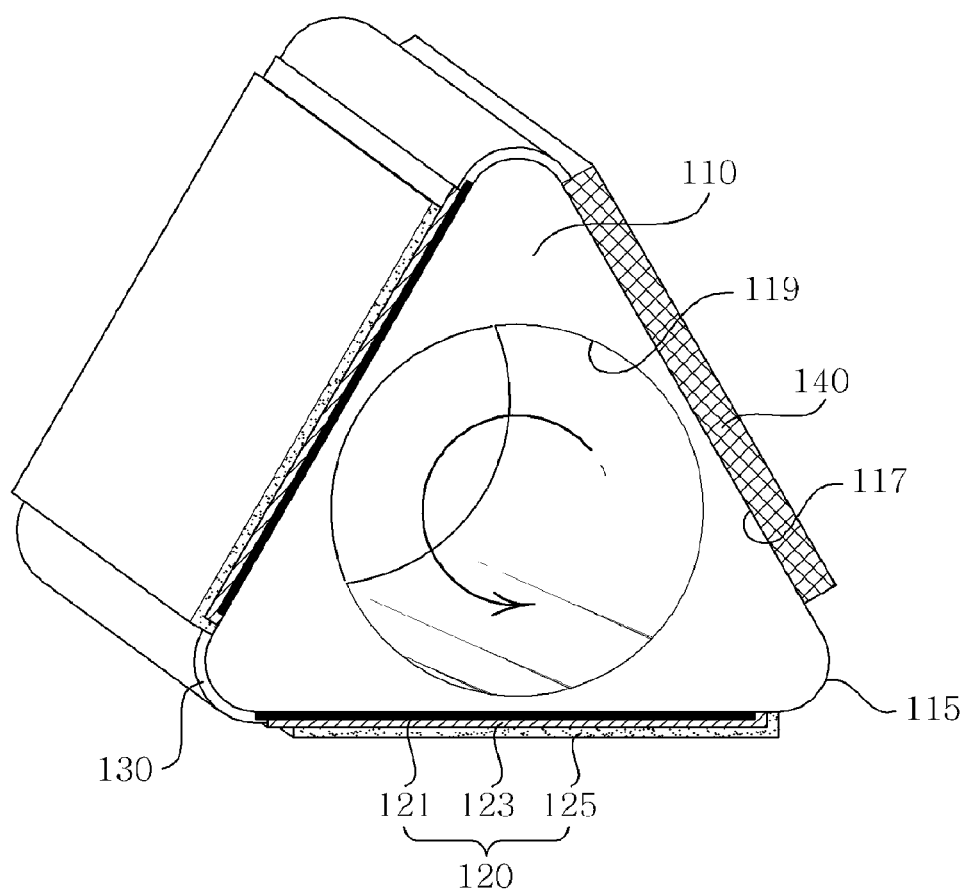
Figure 5:
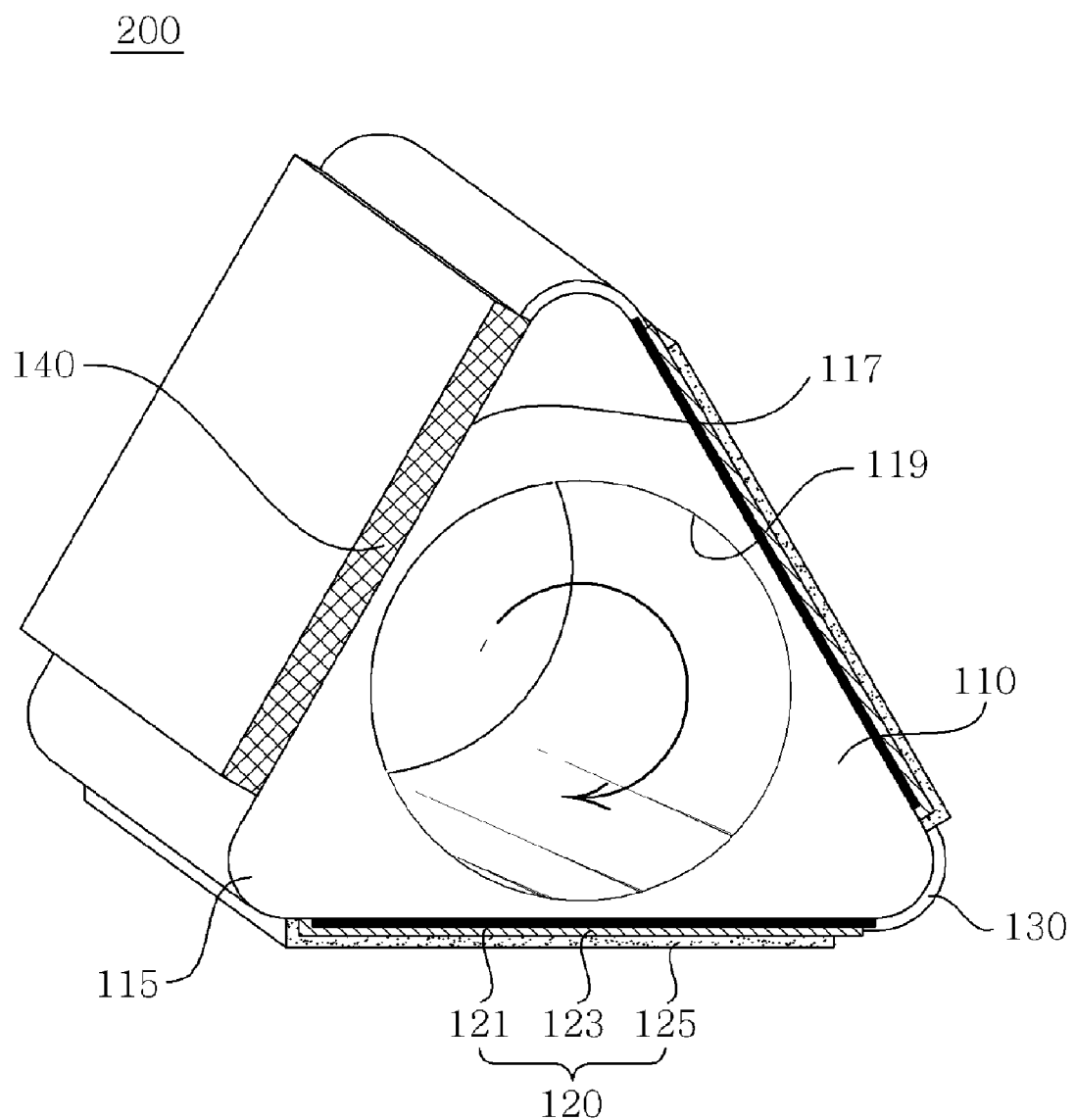
Figure 6:
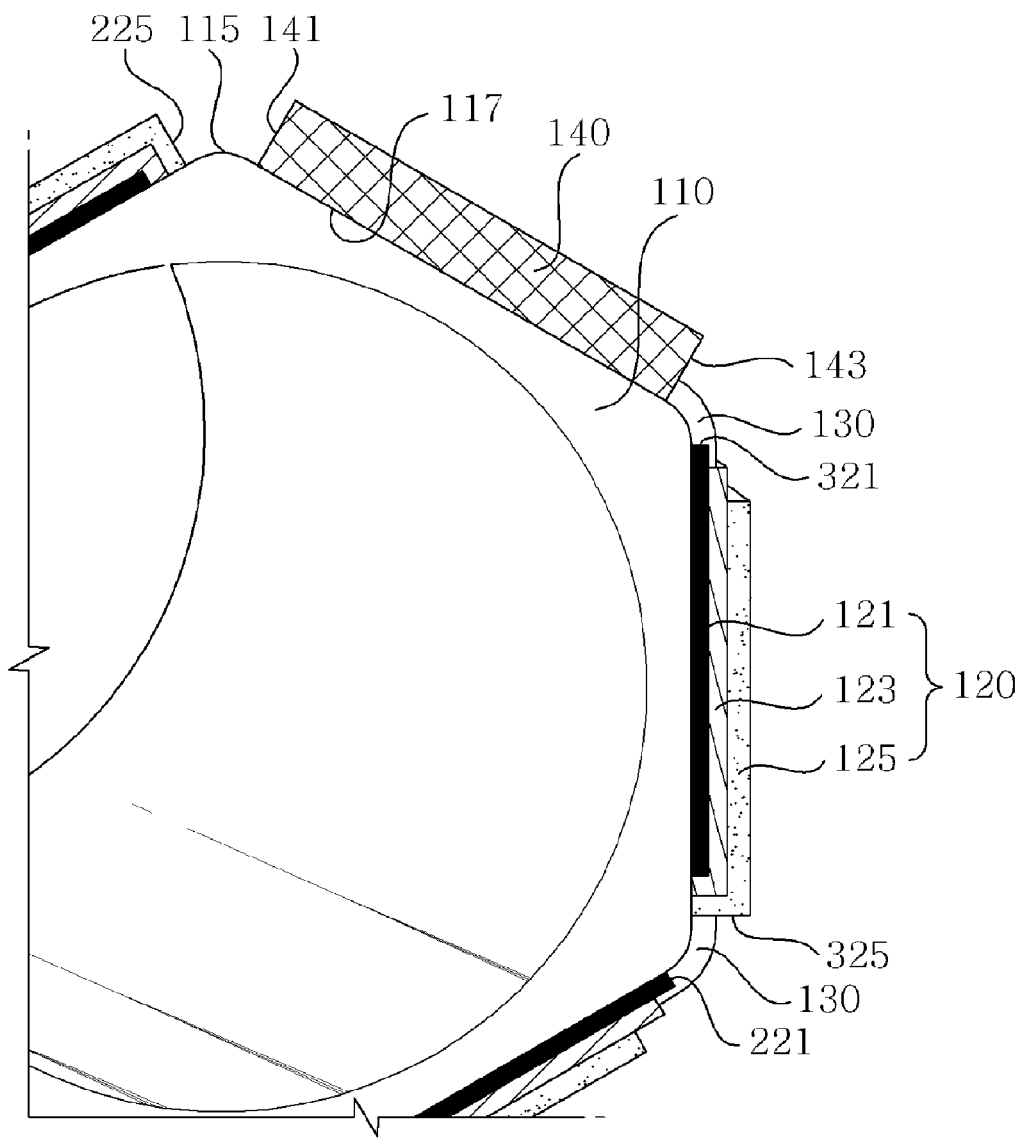
FIG. 6 is an enlarged view showing the main parts of the SOFC of FIG. 3.

FIGS. 2 to 5 are perspective views sequentially showing SOFCs according to a first embodiment of the present invention, and FIG. 6 is an enlarged view showing main parts of the SOFC of FIG. 3.

As shown in FIGS. 2 to 6, each of the SOFCs 100, 200 according to the present embodiment includes a polygonal tubular support 110 the outer surface of which has a plurality of planes, an outer connector 140 formed on one plane 117 of the tubular support among the plurality of planes of the tubular support, a plurality of unit cells 120 respectively formed on two or more remaining planes of the tubular support except for the one plane 117 of the tubular support, and inner connectors 130 for connecting the plurality of unit cells 120 and the outer connector 140 in series.

The SOFC according to the present embodiment may be manufactured in various forms. FIGS. 2 and 3 illustrate SOFCs 100 using a hexagonal tubular support 110, and FIGS. 4 and 5 illustrate SOFCs 200 using a triangular tubular support 110. In addition, an SOFC using a rectangular tubular support, an SOFC using a pentagonal tubular support and so on may be manufactured.

The outer surface of the tubular support 110 may have three, four, five or six planes. This number of planes is merely illustrative and the number (N) of planes may fall within the entire natural number range greater than or equal to 3 and less than infinity ($3 \leq N < \infty$). The number of unit cells 120 connected in series in the SOFC may be governed by the number (N) of planes, and thus the number (N) of planes may be set in consideration of the magnitude of the necessary voltage. Also, the inner connectors 130 may be provided at respective edges between neighboring planes among the plurality of planes of the tubular support. In order to prevent cracking of the inner connectors 130, the edges of the tubular support may be subjected to rounding treatment.

A gas (fuel or air) should be supplied to the inside of the tubular support 110. Thus, in order to increase bonding reliability between the tubular support and a manifold serving as a gas supplier and to prevent the leakage of gas from the bonded portions therebetween, the inner surface 119 of the tubular support 110 may be cylindrically curved. The tubular support 110 should transfer the supplied gas (fuel or air) to a first electrode (e.g. anode or cathode), and thus may be formed of a porous material.

Also, the plurality of unit cells 120 is connected in series on the plurality of planes of the tubular support 110. Thus, in order to prevent the shorting of current at respective unit cells 120, the tubular support 110 may be formed of an insulating material. The tubular support 110 may be formed using a typical ceramic material including yttria-stabilized zirconia (YSZ), in particular, using an alumina ($Al_2O_3$)-based ceramic material which is comparatively inexpensive, thus ensuring price competitiveness.

In the present embodiment, a first electrode is determined to be an anode 121, and a second electrode is determined to be a cathode 125, and thus, a unit cell 120 including these electrodes is specified below.

A unit cell 120 which is a basic unit for producing electrical energy includes an anode 121, an electrolyte 123, and a cathode 125. As mentioned above, the outer surface of the tubular support 110 has a plurality of planes, and a plurality of unit cells 120 is formed on the plurality of planes of the tubular support. Thus, the SOFC according to the present invention is configured such that unit cells 120 are independently formed on two or more remaining planes of the tubular support except for the one plane 117 thereof on which the outer connector 140 is formed, instead of integrally forming unit cells 120 on the outer surface of a support as in conventional techniques. The formation of the unit cells 200 on all of the remaining planes of the tubular support except for the one plane 117 thereof is desirable for the procurement of high voltage. However, upon fabrication of a fuel cell bundle, if unit cells 120 are formed on all of the remaining planes of the tubular support, there may occur a case where connecting fuel cells in a series is impossible, depending on the structure of the fuel cell bundle. Hence, among the remaining planes of the tubular support, a dummy plane on which a unit cell 200 is not formed may be formed.

The formation of the unit cells 120 is described below. Specifically, a plurality of anodes 121 is formed on two or more remaining planes of the tubular support 110 except for edges of the tubular support 110, and a plurality of electrolytes 123 is formed on outer surfaces of the anodes 121 such that the outer surfaces are partially exposed through the electrolytes. Furthermore, a plurality of cathodes 125 is formed on outer surfaces of the electrolytes 123 such that the outer surfaces are partially exposed through the cathodes. The anodes 121 receive fuel from the tubular support 110, and the cathodes 125 receive air from the outside of the fuel cell, thus producing electrical energy.

The electrolytes 123 are formed to be considerably dense and gas impermeable, so that the fuel transferred from the inside of the tubular support 110 to the anodes 121 is prevented from leaking to the outside. Also, the inner connector 130 and the outer connector 140 are provided on the edges and one plane 117 of the tubular support 110 where the electrolytes 123 are not formed, respectively, so as to prevent the leakage of gas.

The inner connectors 130 function to connect the plurality of unit cells 120 and the outer connector 140, which are formed on the tubular support 110, in series, and the outer connector 140 functions to connect the plurality of unit cells 120 connected in series to another fuel cell in series. The SOFC according to the present invention includes a single tubular support 110 and a plurality of unit cells 120 formed thereon, unlike the conventional SOFCs. Thus, the inner connectors 130 are used to connect the plurality of unit cells 120 in series, and the outer connector 140 is used to connect the plurality of unit cells 120 connected in series by means of the inner connectors to another fuel cell in series.

The outer connector 140 and the inner connectors 130 are specified with reference to FIG. 6. As is apparent from this drawing, the outer connector 140 is formed on one plane 117 of the tubular support 110, and the inner connectors 130 are formed at the remaining edges of the tubular support 110 except for an edge 115 of the tubular support 110 between the other end 225 of the unit cell and one end 141 of the outer connector adjacent to each other. The inner connectors 130 are formed at the remaining edges of the tubular support 110 except for the edge 115 thereof so as to electrically connect one end 221 of the anode and the other end 325 of the cathode to each other and one end 321 of the anode and the other end 143 of the outer connector to each other. As such, in the case where the inner connector 130 connected to one end 221, 321 of the anode comes into contact with one end of the cathode 125, a short may occur. Thus, it is desirable to space one end of the cathode 125 apart from the inner connector 130. Furthermore, in the case where the inner connector 130 connected to the other end 325 of the cathode comes into contact with the other end of the anode 121, a short may occur. Thus, the other end of the electrolyte 123 extends toward the tubular support 110 so that the lateral surface of the other end of the anode 121 is covered therewith, thus preventing contact between the inner connector 130 and the other end of the anode 121. In addition, the other end 325 of the cathode extends toward the tubular support 110 so that the extending other end of the electrolyte 123 is covered therewith, thereby enhancing reliability of the electrical connection between the inner connector 130 and the other end 325 of the cathode.

As such, the terms "one end" and "the other end" are relative concepts for explaining portions corresponding to each other and their positions may be reversed. Therefore, according to the above description, the SOFCs of FIGS. 3 and 5 may be manufactured, and as well, the SOFCs of FIGS. 2 and 4 may also be manufactured. Specifically, the SOFCs of FIGS. 3 and 5 include unit cells connected in series in a clockwise direction (see the arrow) based on the outer connector 140, whereas the SOFCs of FIGS. 2 and 4 include unit cells connected in series in a counterclockwise direction (see the arrow) based on the outer connector 140.

Because the inner connectors 130 and the outer connector 140 are means for forming an electrical connection, they should be made of a material which is electrically conductive, and also should be gas impermeable in order to prevent fuel supplied from the inside of the tubular support 110 to the anodes 121 from leaking from one plane 117 and edges of the tubular support. Furthermore, in order to prevent the leakage of gas from the edge 115 of the tubular support where the inner connector 130 is not formed, an additional gas impermeable material (not shown) may be applied on the edge 115 of the tubular support. In addition, in the case where a dummy plane is formed among the remaining planes of the tubular support, an additional gas impermeable material (not shown) for preventing leakage of gas may also be applied on the dummy plane.

The outer connector 140 may be provided in the form of a flat plate so as to be easily bonded to another fuel cell, but the present invention is not limited thereto. The outer connector 140 may be manufactured in various forms in consideration of the shape of the resulting SOFC bundle.

As mentioned above, the first electrode is determined to be the anode 121 and the second electrode is determined to be the cathode 125, but the present invention is not limited thereto. Alternatively, the first electrode may be determined to be a cathode 125 and the second electrode may be determined to be an anode 121 and thus an SOFC including these electrodes may be manufactured.

Unlike conventional SOFCs, the SOFC according to the present invention includes a single tubular support 110 and a plurality of unit cells 120 connected in series thereon, thus producing electrical energy, so that power density per unit volume may be increased, and high voltage can be maintained while current is being collected, thereby reducing power loss due to electrical resistance. For example, in the case of a polygonal tubular support 110 the outer plane of which has six planes (FIGS. 2 and 3), when respective unit cells 120 are maintaining an ideal voltage of 1.1 V, the SOFC 100 according to the present invention (including unit cells 120 formed on all of the remaining planes of the tubular support) may produce electrical energy having a voltage of 5.5 V. Hence, the SOFC according to the present invention may produce voltage five times as high as that of the conventional SOFCs under the same conditions, thus reducing power loss due to electrical resistance.

The method of manufacturing the SOFC according to the first embodiment of the present invention includes preparing a polygonal tubular support 110 the outer surface of which has a plurality of planes, respectively forming a plurality of unit cells 120 and an outer connector 140 on the plurality of planes of the tubular support 110, and providing inner connectors 130 for connecting the plurality of unit cells 120 in series.

Specifically, first, the polygonal tubular support 110 the outer surface of which has a plurality of planes is prepared. The edges of the tubular support 110 are provided with inner connectors 130 in a subsequent procedure, and may thus be subjected to rounding treatment 117 in order to prevent cracking of the inner connectors 130. As mentioned above, the tubular support 110 may be formed of a material having insulating properties so as to prevent the shorting of current and being porous so as to transfer fuel to anodes 121.

Subsequently, the outer connector 140 is formed on one plane 117 of the tubular support, and the plurality of unit cells 120 is respectively formed on two or more remaining planes of the tubular support except for the one plane 117 of the tubular support. The outer connector 140 should be gas impermeable so as to prevent fuel supplied from the inside of the tubular support 110 to anodes 121 from leaking from the one plane 117 of the tubular support, and the plurality of unit cells 120 is configured such that anodes 121, electrolytes 123 and cathodes 125 are sequentially formed.

The anodes 121 are respectively formed on the remaining planes of the tubular support 110 except for the edges of the tubular support 110. As such, it should be noted that the anodes 121 formed on respective remaining planes of the tubular support 110 are not in contact with each other.

The anodes 121 may be made of a material (nickel/YSZ cermet) obtained by sintering nickel oxide powder containing 40~60% zirconia powder. As such, nickel oxide is reduced to metal nickel by means of hydrogen upon production of electrical energy, thus exhibiting electronic conductivity.

Subsequently, the electrolytes 123 are formed on outer surfaces of the anodes 121 such that the outer surfaces are partially exposed through the electrolytes 123. In order to prevent a short from occurring as a result of the inner connector 130 to be connected to the other end 325 of the cathode in a subsequent procedure coming into contact with the other end of the anode 121, the other end of each of the electrolytes 123 extends toward the tubular support 110 so that the lateral surface of the other end of each of the anodes 121 is covered therewith.

The electrolytes 123 function to prevent the fuel supplied from the inside of the tubular support 110 to the anodes 121 from leaking to the outside, and should not have small clearances, pores or scratches. The electrolytes 123 may be made of yttria-stabilized zirconia (YSZ) in which zirconia ($ZrO_2$) is doped with about 3~10% of yttria ($Y_2O_3$). As such, YSZ, in which part of tetravalent zirconium ions is substituted by trivalent yttrium ions which is thus accompanied by the formation of one oxygen ion vacancy per two yttrium ions, allows the migration of oxygen ions via oxygen ion vacancies at high temperature.

Subsequently, the cathodes 125 are formed on outer surfaces of the electrolytes 123 such that the outer surfaces are partially exposed through the cathodes 125. As such, in order to enhance reliability of the electrical connection between the other end of the cathode 125 and the inner connector 130 in a subsequent procedure, the other end 325 of each of the cathodes extends toward the tubular support 110 and thus covers the other end of each of the electrolytes 123. Also, in order to prevent the shorting of current, it is desirable to space one end of the cathode 125 apart from the inner connector 130 which is to be connected to one end 221, 321 of the anode.

The cathodes 125 may be made of a Perovskite type oxide. Particularly useful is lanthanum strontium manganite ($La_{0.84}Sr_{0.16}$)$MnO_3$ which has high electronic conductivity. At the cathodes 125, $LaMnO_3$ converts oxygen into oxygen ions, which are then delivered to the anodes 121.

In the case where the first electrode is determined to be a cathode 125 and the second electrode is determined to be an anode 121, the positions where the anode 121 and the cathode 125 are formed may be reversed.

The process of forming the anodes 121, the cathodes 125 and the electrolytes 123 includes a dry process and a wet process. The dry process may include for example plasma spraying, electrochemical deposition, sputtering, ion beam sputtering, ion implantation, etc., and the wet process may include for example tape casting, spray coating, dip coating, screen printing, doctor blade coating, etc. In the present invention, when forming the anodes 121, the cathodes 125 and the electrolytes 123, in consideration of precision and economic efficiency, any one or a combination of two or more selected from among the above-stated processes may be used. For example, when electrolytes 123 are formed, an adhesive mask is applied on the edges and one plane 117 of the tubular support 110, dip coating is performed, and the adhesive mask is removed, thereby forming the electrolytes 123 on outer surfaces of the first electrodes except for the edges and one plane 117 of the tubular support such that the outer surfaces are partially exposed through the electrolytes. When unit cells having cathodes 125, electrolytes 123 and anodes 121 formed in sequential order are manufactured, a plasma spraying process may be adopted to precisely form the anodes 121 while preventing deformation of the cathodes 125.

Subsequently, the inner connectors 130 which connect the plurality of unit cells 120 and the outer connector 140 in series are provided. Specifically, the inner connectors 130 are provided at the remaining edges of the tubular support except for an edge 115 of the tubular support so as to connect one end 221 of the anode and the other side 325 of the cathode to each other and one end 321 of the anode and the other end 143 of the outer connector to each other. Furthermore, the inner connectors 130 should be gas impermeable so that fuel supplied from the inside of the tubular support 110 to the anodes 121 is prevented from leaking from the edges of the tubular support. Also, in order to prevent the leakage of gas from the edge 115 of the tubular support where the inner connector 130 is not formed, an additional gas impermeable material (not shown) may be provided at the edge 115 of the tubular support. In addition, in the case where a dummy plane is formed among the remaining planes of the tubular support, an additional gas impermeable material (not shown) may also be applied on the dummy plane so as to prevent leakage of gas.

In the present embodiment, the first electrode is determined to be the anode 121 and the second electrode is determined to be the cathode 125, but the scope of the present invention is not limited thereto. In the case where the first electrode is a cathode 125 and the second electrode is an anode 121, unit cells 120 may be formed in the same manner, which is also incorporated in the scope of the present invention. In the case where the outermost electrode is the cathode 125, the inner connectors 130 and the outer connector 140 are exposed to an oxidizing atmosphere, and thus should be formed of an oxidation resistant material.

Figure 7:
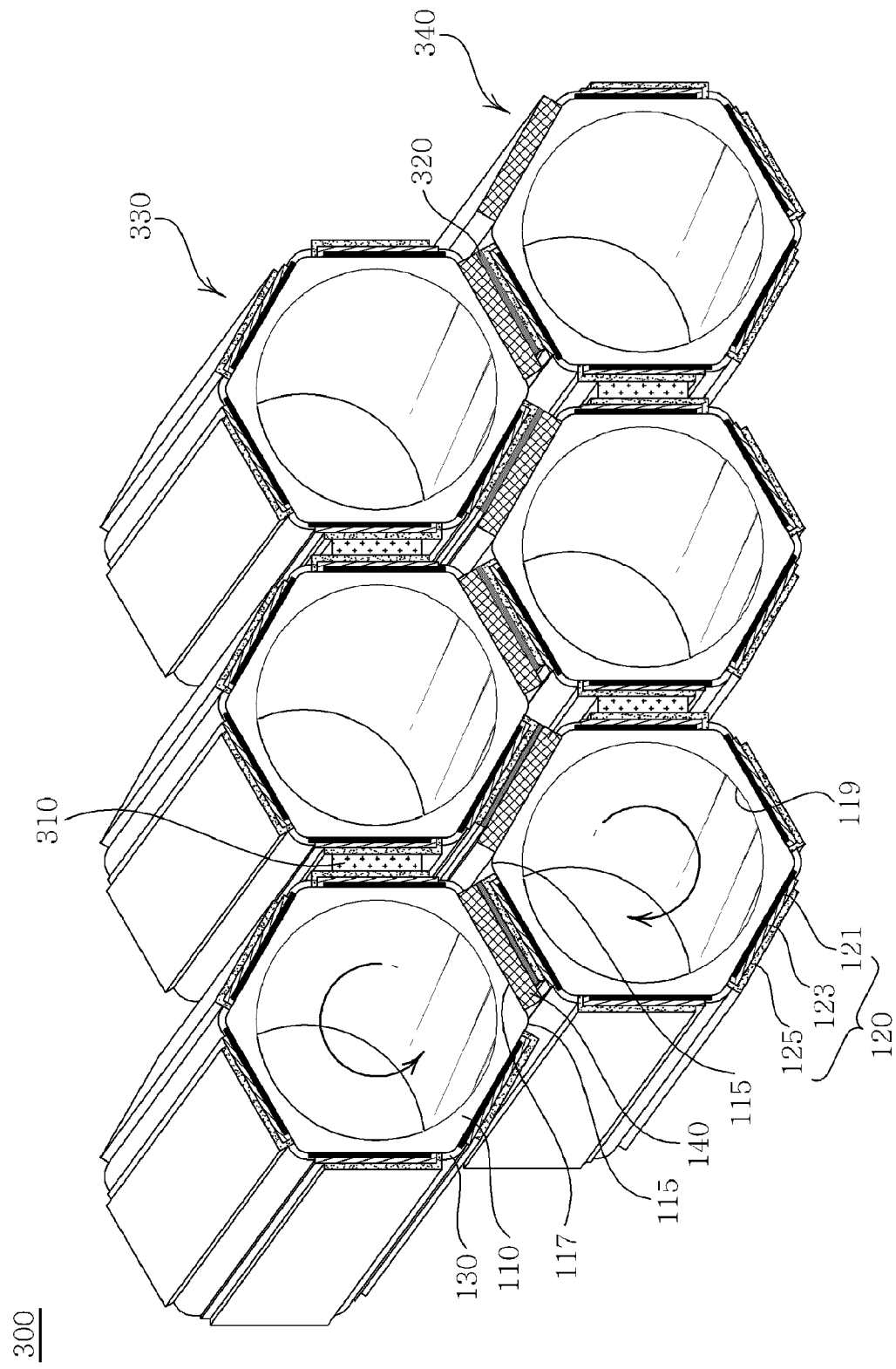
FIGS. 7 and 8 are perspective views showing SOFC bundles according to the first embodiment of the present invention.
Figure 8:
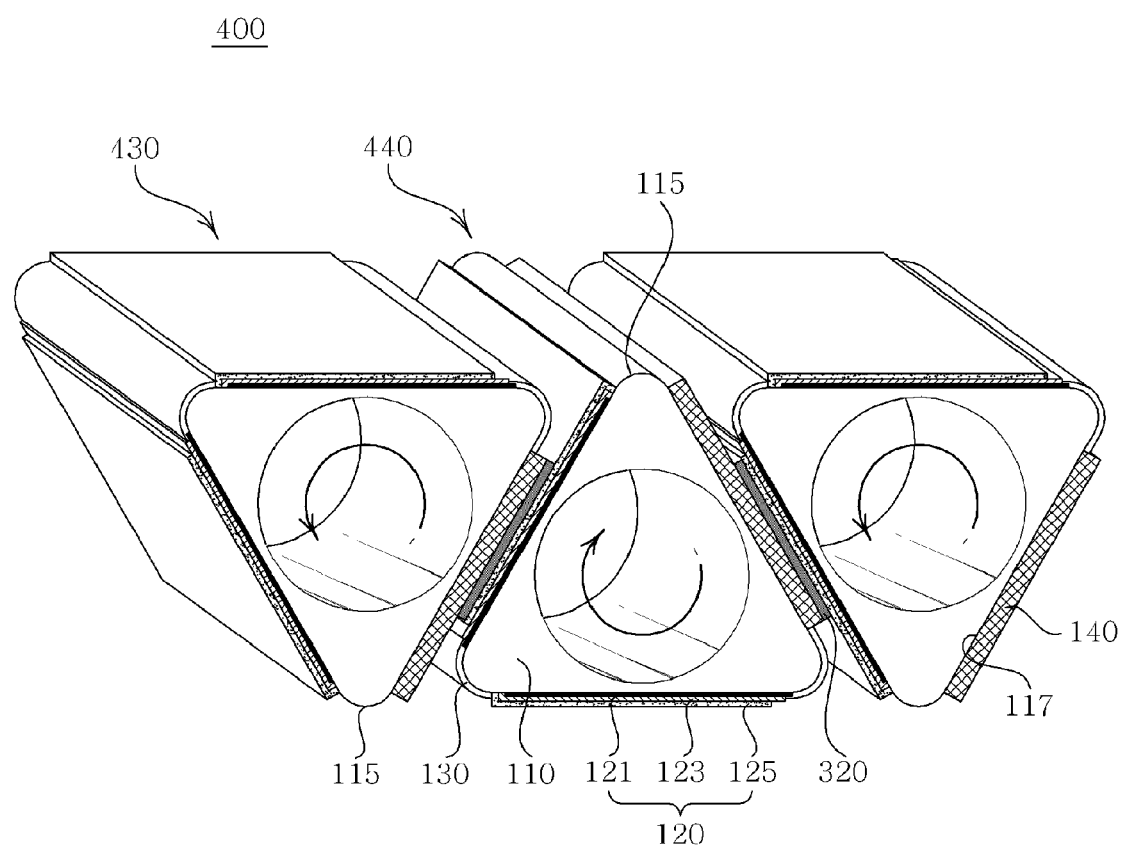

FIGS. 7 and 8 are perspective views showing SOFC bundles according to the first embodiment of the present invention.

As shown in FIGS. 7 and 8, each of the SOFC bundles 300, 400 according to the present embodiment includes a plurality of fuel cells each of which includes a polygonal tubular support 110 the outer surface of which has a plurality of planes, an outer connector 140 formed on one plane 117 of the tubular support 110 among the plurality of planes of the tubular support 110, a plurality of unit cells 120 respectively formed on two or more remaining planes of the tubular support except for the one plane 117 of the tubular support, and inner connectors 130 for connecting the plurality of unit cells 120 and the outer connector 140 in series. As such, the plurality of fuel cells is connected in series in a manner such that the outer connector 140 of a fuel cell is bonded with the unit cell 120 of an additional fuel cell.

Specifically, the SOFC bundles 300, 400 according to the present embodiment may be manufactured from the plurality of SOFCs described as above. The description the same as the above-mentioned SOFC is omitted, and the different portions thereof are described below.

In this embodiment, the SOFC may be manufactured in various forms as the number of planes is not limited. Accordingly, the SOFC bundle may also be manufactured in various forms. In the SOFC bundle, the plurality of fuel cells is connected in series by bonding the outer connector 140 of a fuel cell to the unit cell 120 of an additional fuel cell. Hence, the plurality of fuel cells each of which has unit cells 120 connected in series and which are connected in series are maintaining higher voltage upon collection of current, thus reducing power loss due to electrical resistance.

The bonding between the outer connector 140 and the unit cell 120 may be performed using a material which is electrically conductive and porous, such as metal foam 320, metal felt or metal paste, in order to achieve a secure electrical connection and to efficiently supply gas to the unit cells 120.

As such, when the unit cells 200 are formed on all of the remaining planes except for one plane 117 of the tubular support 110, high voltage may be obtained. However, upon fabrication of a fuel cell bundle, if the unit cells 120 are formed on all of the remaining planes of the tubular support, there may occur a case where connection of fuel cells in series is impossible depending on the structure of the fuel cell bundle. Hence, among the remaining planes of the tubular support, a dummy plane where the unit cell 200 is not formed may be formed.

With reference to FIG. 7, the SOFC bundle 300 according to the present invention may be formed by stacking the plurality of fuel cells in two layers. The tubular support 110 may be a hexagonal tubular support 110 the outer surface of which has six planes, and unit cells 120 are respectively formed on five remaining planes of the tubular support. The plurality of fuel cells includes a plurality of first fuel cells 330 each of which has an outer connector 140 formed in a counterclockwise direction (see the arrow) of an edge 115 of the tubular support where an inner connector 130 is not formed, and a plurality of second fuel cells 340 each of which has an outer connector 140 formed in a clockwise direction (see the arrow) of the edge 115 of the tubular support. The first fuel cells 330 include unit cells connected in series in a counterclockwise direction (see the arrow) based on the outer connector 140 as in the fuel cell of FIG. 2, and the second fuel cells 340 include unit cells connected in series in a clockwise direction (see the arrow) as in the fuel cell of FIG. 3.

The SOFC bundle 300 may be manufactured by continuously performing bonding between the outer connector 140 of a first fuel cell 330 and the unit cell 120 formed in a counterclockwise direction of the edge 115 of a second fuel cell 340 and bonding between the outer connector 140 of the second fuel cell 340 and the unit cell 120 formed in a clockwise direction of the edge 115 of an additional first fuel cell 330.

The above bonding allows current to sequentially flow from the unit cells 120 formed in a clockwise direction of the edge 115 of a first fuel cell 330, via the outer connector 140 of the first fuel cell 330, the unit cells 120 formed in a counterclockwise direction of the edge 115 of a second fuel cell 340, the outer connector 140 of the second fuel cell 340 and the unit cells 120 formed in a clockwise direction of the edge 115 of an additional first fuel cell 330, to the outer connector 140 of the additional first fuel cell 330. When the above bonding is repeatedly performed, the fuel cells may be stacked in two layers in parallel without the number thereof being limited, thereby forming the SOFC bundle 300. Thus, the number of fuel cells is controlled upon formation of the bundle, thereby obtaining the desired voltage.

For example, in the case of the SOFC bundle 300 having six fuel cells using the hexagonal tubular support 110 as seen in FIG. 7, when respective unit cells 120 are to maintaining an ideal voltage of 1.1 V, the SOFC bundle 300 according to the present embodiment may produce electrical energy having a voltage of 33 V (5.5 V×6).

As such, if the unit cell 12 of a fuel cell comes into contact with the unit cell 120 of an additional fuel cell adjacent thereto, a short may occur, undesirably making it impossible to realize the entire series connection of fuel cells and making it difficult to supply gas to the cathode 125 of the unit cell 120. With the goal of solving this problem, the outer connector 140 may be formed thicker than the unit cells 120 so that the first fuel cells 330 are spaced apart from each other and the second fuel cells 340 are spaced apart from each other, thereby preventing contact between the unit cells 120. Furthermore, in order to stabilize the structure of the SOFC bundle 300 and to efficiently supply gas, a material having insulating properties and being porous, such as a porous ceramic plate 310, ceramic foam, glass fiber, glass cotton or the like, may be applied in spaces between the adjacent first fuel cells 330 disposed in parallel and between the adjacent second fuel cells 340 disposed in parallel.

With reference to FIG. 8, the SOFC bundle 400 according to the present invention includes a plurality of fuel cells stacked in one layer. The tubular support 110 is a triangular tubular support 110 the outer surface of which has three planes, and the unit cells 120 are respectively formed on two remaining planes of the tubular support 110. The plurality of fuel cells includes a plurality of first fuel cells 430 each of which has an outer connector 140 formed in a counterclockwise direction (see the arrow) of an edge 115 of the tubular support where an inner connector 130 is not formed, and a plurality of second fuel cells 440 each of which has an outer connector 140 formed in a clockwise direction (see the arrow) of the edge 115 of the tubular support. The first fuel cells 430 include unit cells connected in series in a counterclockwise direction (see the arrow) based on the outer connector 140 as in the fuel cell of FIG. 4, and the second fuel cells 440 include unit cells connected in series in a clockwise direction (see the arrow) as in the fuel cell of FIG. 5.

The SOFC bundle 400 may be manufactured by continuously performing bonding between the outer connector 140 of a first fuel cell 430 and the unit cell 120 formed in a counterclockwise direction of the edge 115 of a second fuel cell 440, and bonding between the outer connector 140 of the second fuel cell 440 and the unit cell 120 formed in a clockwise direction of the edge 115 of an additional first fuel cell 430.

The above bonding allows current to sequentially flow from the unit cells 120 formed in a clockwise direction of the edge 115 of a first fuel cell 430, via the outer connector 140 of the first fuel cell 430, the unit cells 120 formed in a counterclockwise direction of the edge 115 of a second fuel cell 440, the outer connector 140 of the second fuel cell 440 and the unit cells 120 formed in a clockwise direction of the edge 115 of an additional first fuel cell 430, to the outer connector 140 of the additional first fuel cell 430. When the above bonding is repeatedly conducted, the fuel cells may be stacked in one layer in parallel without the number thereof being limited, thereby forming the SOFC bundle 400. Thus, the number of fuel cells is controlled, thus obtaining the desired voltage.

For example, in the case of the SOFC bundle 400 having three fuel cells using the triangular tubular support 110 as seen in FIG. 8, when respective unit cells 120 are maintaining an ideal voltage of 1.1 V, the SOFC bundle 400 according to the present embodiment may produce electrical energy having a voltage of 6.6 V (2.2 V×3).

Moreover, in order to form the SOFC bundle having a stable parallel structure as mentioned above, angles between planes forming the edges of the tubular support 110 may be equal to each other. For example, in the case of the hexagonal tubular support 110, internal angles between the planes forming the edges may be 120°. In the case of the triangular tubular support 110, internal angles between the planes forming the edges may be 60°.

Figure 9:
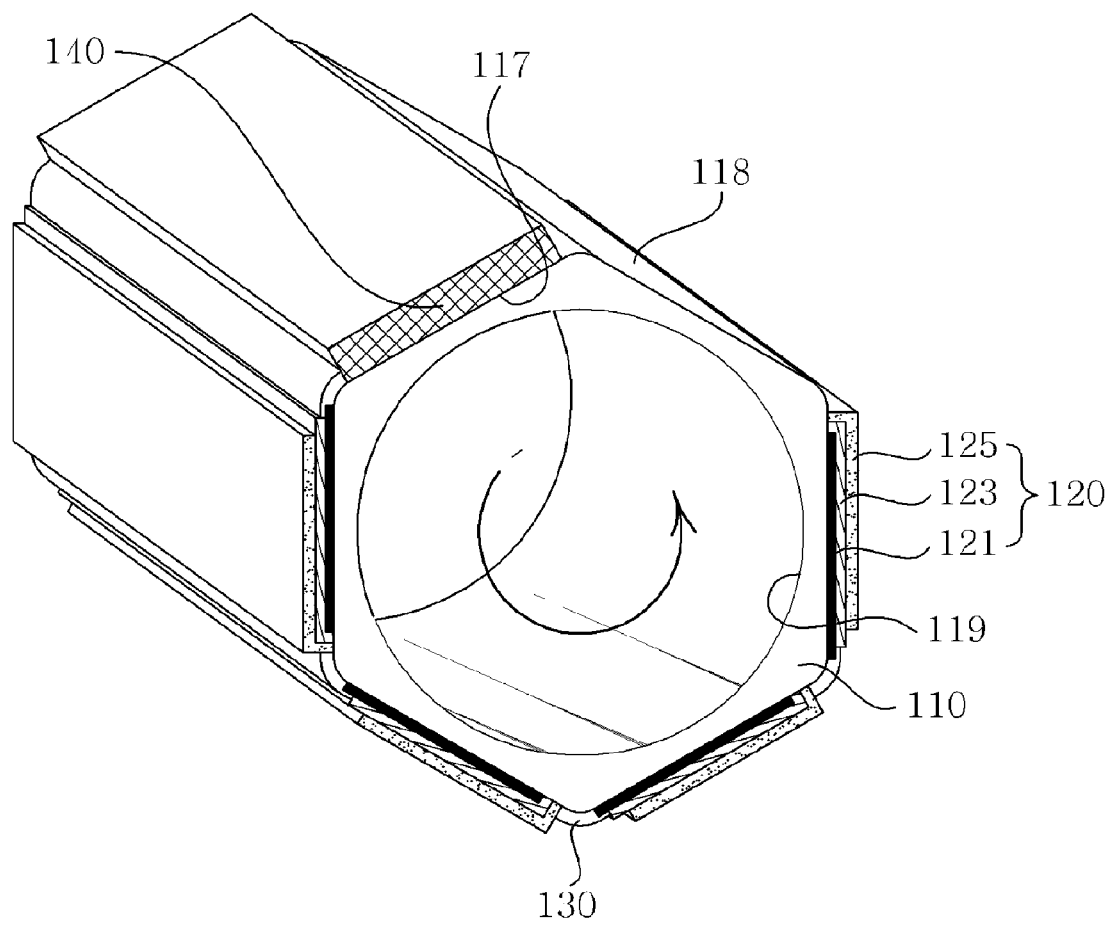
FIGS. 9 and 10 are perspective views showing SOFCs according to a second embodiment of the present invention.
Figure 10:
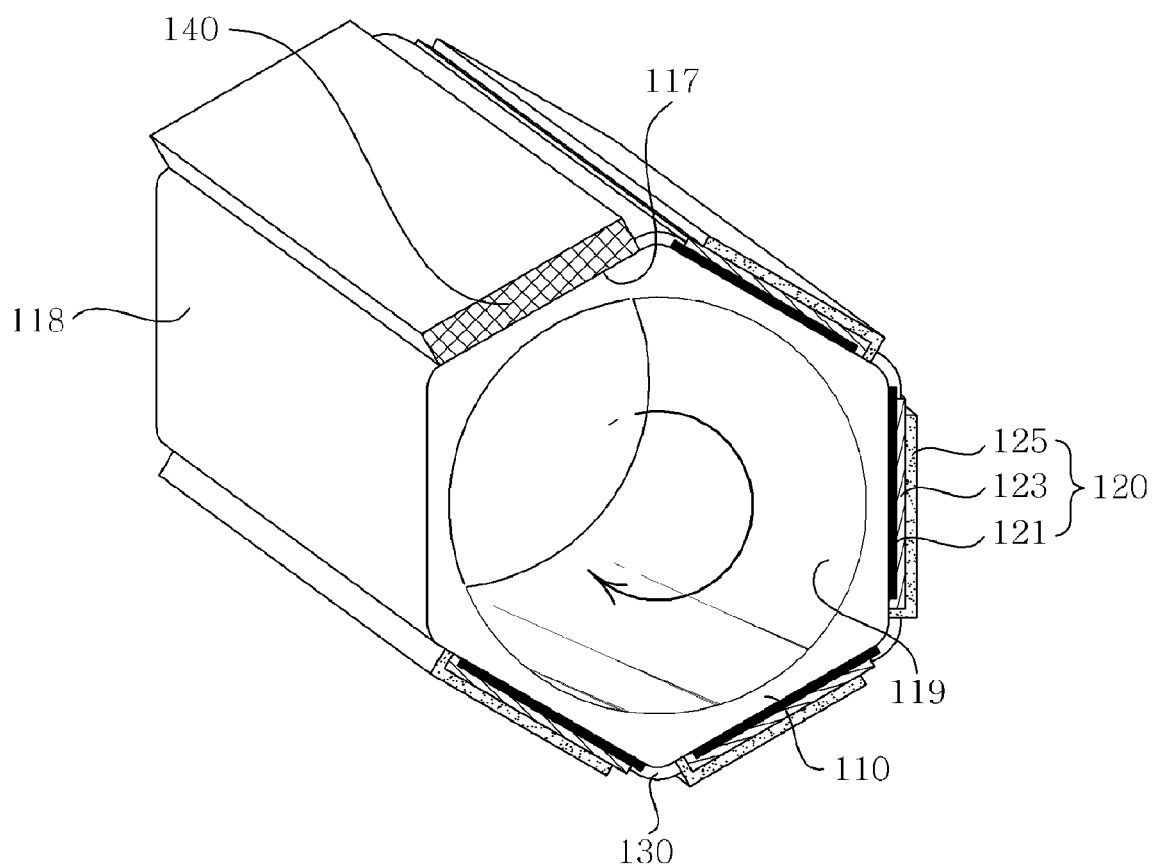
Figure 11:
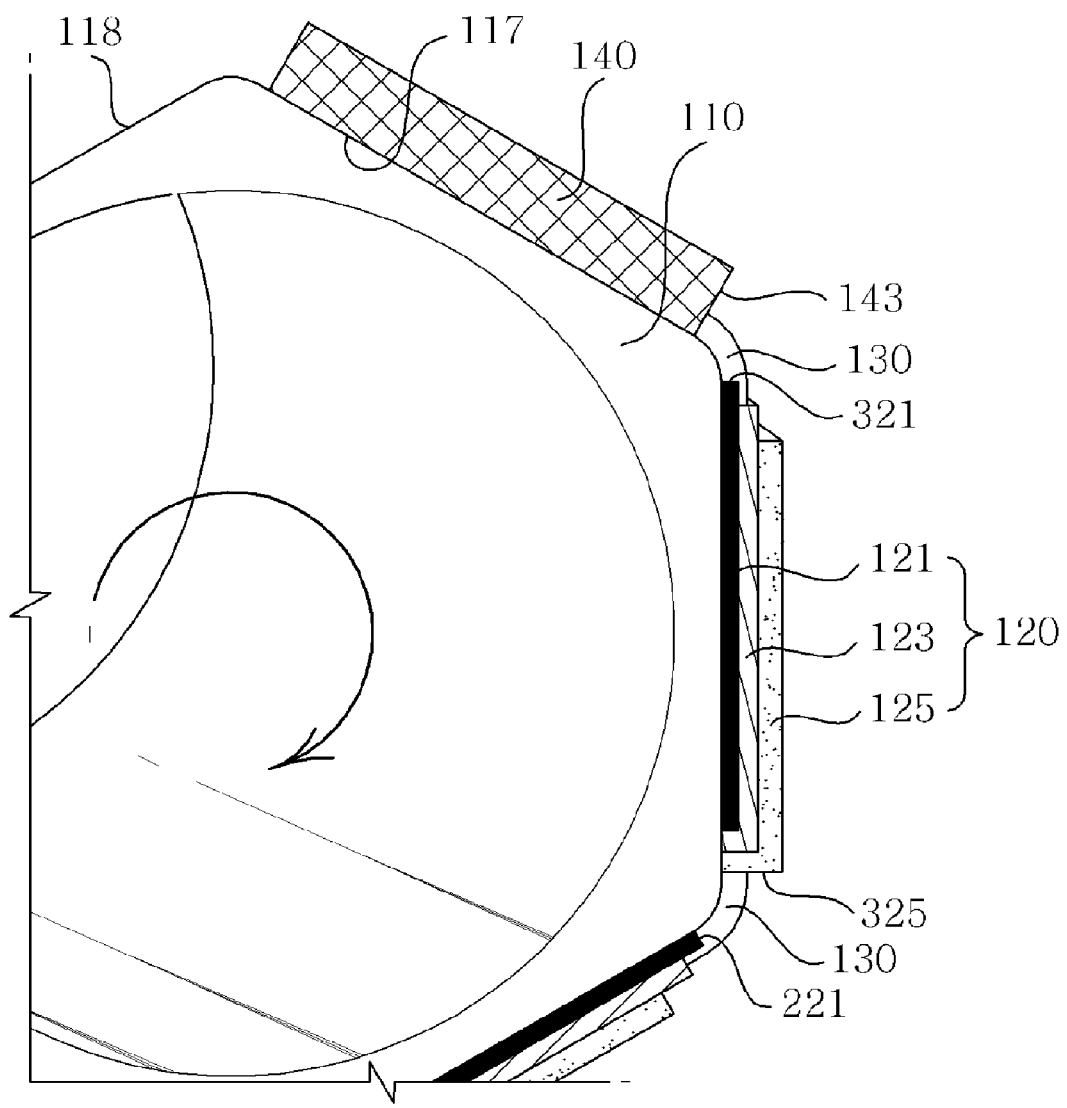
FIG. 11 is an enlarged view showing main parts of the SOFC of FIG. 10.

FIGS. 9 and 10 are perspective views showing SOFCs according to a second embodiment of the present invention, and FIG. 11 is an enlarged view showing main parts of the SOFC of FIG. 10.

As shown in FIGS. 9 to 11, each of the SOFCs 500, 700 according to the present embodiment includes a polygonal tubular support 110 the outer surface of which has N planes in which N is an even number of 6 or more, an outer connector 140 formed on one plane 117 among the N planes of the tubular support, (N+2)/2 unit cells 120 formed on respective (N+2)/2 remaining planes continuously arranged in one direction from the one plane 117 of the tubular support, and inner connectors 130 for connecting the unit cells 120 and the outer connector 140 in series.

The SOFC according to the present embodiment may be manufactured in various forms. FIGS. 9 and 10 illustrate SOFCs 500, 700 using a hexagonal tubular support 110. In addition, SOFCs (FIGS. 14 and 15) using an octagonal tubular support 110, an SOFC using a decagonal tubular support 110 and so on may be manufactured.

The outer surface of the tubular support 110 may have six, eight or ten planes. This number (N) of planes is merely illustrative, and N may be an even number of 6 or more. The reason why the number (N) of planes is limited to an even number of 6 or more is to form SOFC bundles 600, 800, 900, 1000, which will be specified later.

In this embodiment, a first electrode is determined to be an anode 121, and a second electrode is determined to be a cathode 125, and thus a unit cell 120 including these electrodes is specified below.

A unit cell 120 which is a basic unit for producing electrical energy includes an anode 121, an electrolyte 123, and a cathode 125. As mentioned above, the outer surface of the tubular support 110 has N planes in which N is an even number of 6 or more. In order to form the SOFC bundles 600, 800, 900, 1000 which will be described later, (N+2)/2 unit cells 120 are formed on (N+2)/2 remaining planes of the tubular support. The SOFCs 500, 700 according to the present invention are configured such that unit cells 120 are independently formed on (N+2)/2 remaining planes continuously arranged in one direction from one plane 117 of the tubular support where the outer connector 140 is formed, in lieu of integrally forming unit cells on the outer surface of a support as in conventional techniques. As such, the term "one direction" indicates a clockwise direction (FIG. 10) or a counterclockwise direction (FIG. 9) based on the transverse cross-section of the unit cell 120. The reason why the unit cells 120 are not formed on all of the remaining planes of the tubular support except for one plane 117 where the outer connector 140 is formed is to form the SOFC bundles 600, 800, 900, 1000. Among the remaining planes of the tubular support, any plane where the unit cell 120 is not formed is referred to as a dummy plane 118.

The formation of the unit cells 120 is described in detail below. Specifically, (N+2)/2 anodes 121 are respectively formed on the remaining planes of the tubular support 110 except for the edges of the tubular support 110, and (N+2)/2 electrolytes 123 are formed on outer surfaces of the anodes 121 such that the outer surfaces are partially exposed through the electrolytes. Also, (N+2)/2 cathodes 125 are formed on outer surfaces of the electrolytes 123 such that the outer surfaces are partially exposed through the cathodes. The anodes 121 receive fuel from the tubular support 110, and the cathodes 125 receive air from the outside of the fuel cell, thus producing electrical energy.

The inner connectors 130 play a role in connecting the (N+2)/2 unit cells 120 and the outer connector 140, which are formed on the tubular support 110, in series, and the outer connector 140 is responsible for connecting the plurality of unit cells 120 connected in series to another fuel cell in series. In the SOFCs 500, 700 according to the present invention, (N+2)/2 unit cells 120 are formed on a single tubular support 110, unlike conventional SOFCs. Thus, the inner connectors 130 are used to connect the (N+2)/2 unit cells 120 in series, and the outer connector 140 is used to connect the (N+2)/2 unit cells 120 connected in series by means of the inner connectors 130 to another fuel cell in series.

The outer connector 140 and the inner connectors 130 are specified with reference to FIG. 11. The outer connector 140 is formed on one plane 117 of the tubular support 110, and the inner connectors 130 are formed at edges between the (N+2)/2 remaining planes having the unit cells 120 formed thereon and at an edge between the one plane 117 and the remaining plane adjacent to the one plane 117 in one direction (a clockwise direction in FIG. 11). The inner connectors 130 are used to electrically connect one end 221 of the anode and the other end 325 of the cathode, which are formed at both sides of each of edges between the (N+2)/2 remaining planes having the unit cells 120 formed thereon, to each other, and also to electrically connect one end 321 of the anode and the other end 143 of the outer connector 140, which are formed at both sides of the edge between the one plane 117 of the tubular support and the remaining plane adjacent to the one plane 117 in one direction (a clockwise direction in FIG. 11), to each other. As such, in the case where the inner connector 130 connected to one end 221, 321 of the anode comes into contact with one end of the cathode 125, a short may occur. Thus, it may be desired to space one end of the cathode 125 apart from the inner connector 130. Furthermore, in the case where the inner connector 130 connected to the other end 325 of the cathode comes into contact with the other end of the anode 121, a short may occur. Thus, the other end of the electrolyte 123 extends toward the tubular support 110 so that the lateral surface of the other end of the anode 121 is covered therewith, thus preventing contact between the inner connector 130 and the other end of the anode 121. Furthermore, the other end 325 of the cathode extends toward the tubular support 110 and thus covers the extending other end 123 of the electrolyte, thereby enhancing reliability of the electrical connection between the inner connector 130 and the other end 325 of the cathode.

As such, the term "one direction" indicates a clockwise direction or a counterclockwise direction as a relative concept as mentioned above. Whereas the SOFC 700 of FIGS. 10 and 11 has unit cells connected in series in a clockwise direction based on the outer connector 140, the SOFC 500 of FIG. 9 has unit cells connected in series in a counterclockwise direction based on the outer connector 140.

As above, the first electrode is determined to be an anode 121, and the second electrode is determined to be a cathode 125, but the present invention is not limited thereto. The first electrode may be set as the cathode 125 and the second electrode may be set as the anode 121, and thus the SOFCs 500, 700 including these electrodes may also be manufactured.

Unlike conventional SOFCs, in the SOFC according to the present invention, (N+2)/2 unit cells 120 are connected in series on a single tubular support 110, thus producing electrical energy, so that power density per unit volume may be increased, and upon collection of current, high voltage may be maintained, thereby reducing power loss due to electrical resistance. For example, in the case of the tubular support 110 the outer surface of which has six planes (FIGS. 9 and 10), when respective unit cells 120 maintain an ideal voltage of 1.1 V, the SOFCs 500, 700 according to the present invention may produce electrical energy having a voltage of 4.4 V. Hence, the SOFC according to the present invention may produce voltage four times as high as that of the conventional SOFCs under the same conditions, thus reducing power loss due to electrical resistance.

Figure 12:
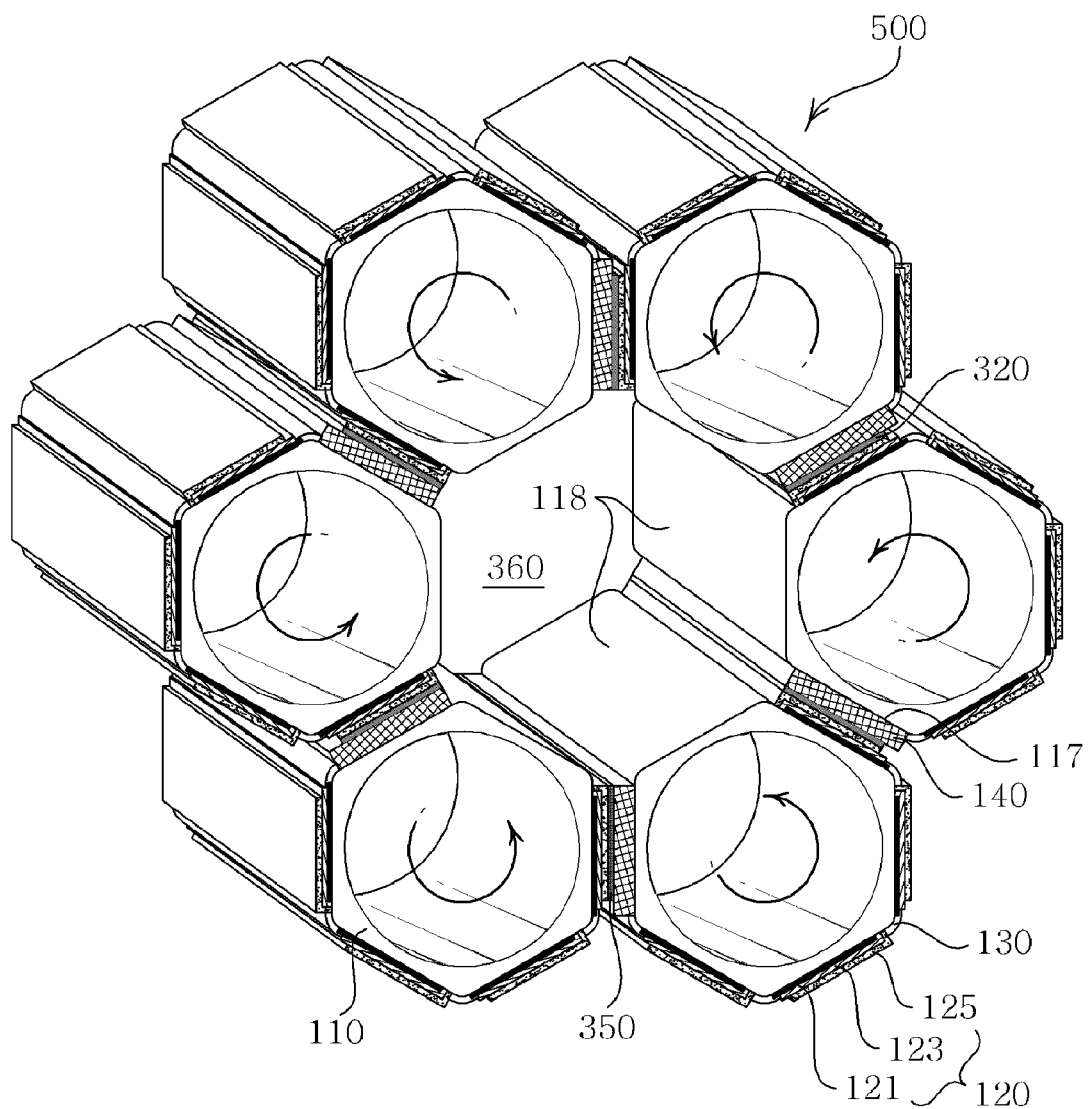
FIGS. 12 and 13 are perspective views showing SOFC bundles according to the second embodiment of the present invention.
Figure 13:
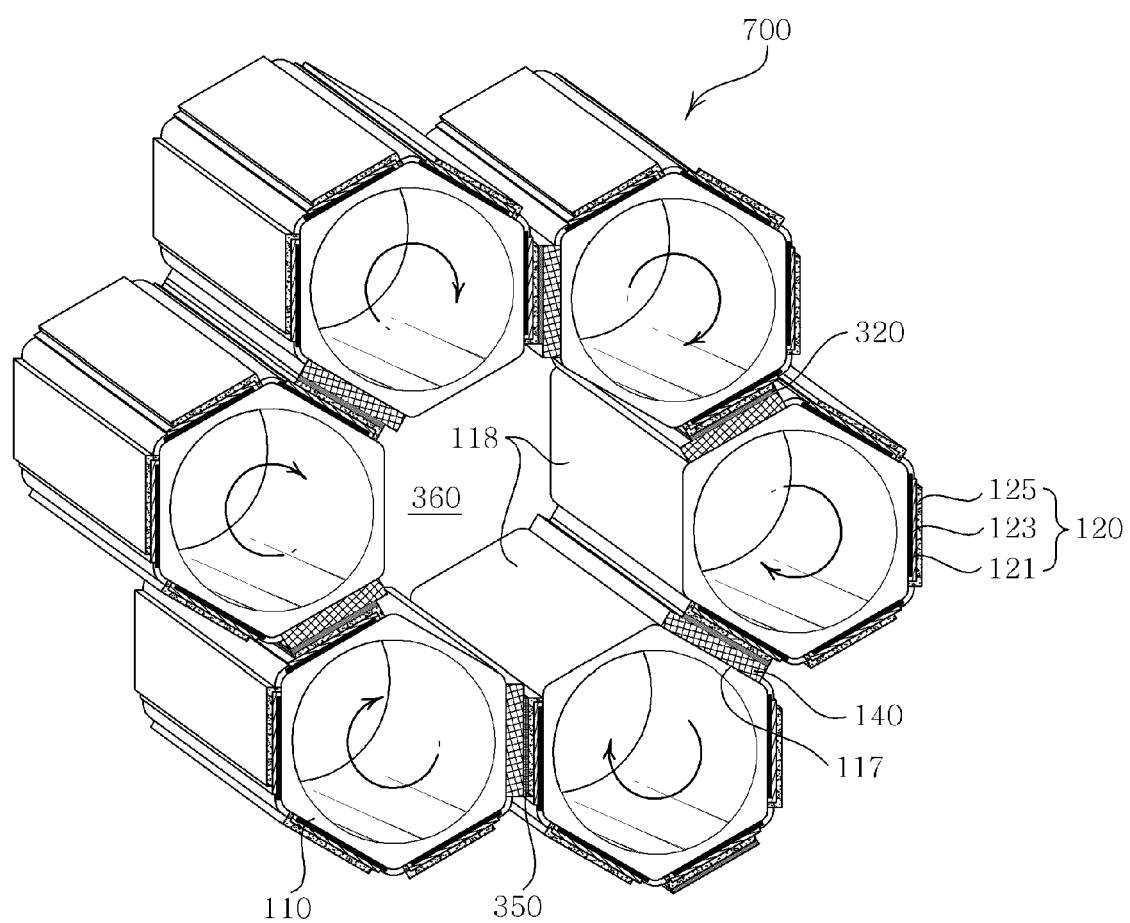
Figure 14:
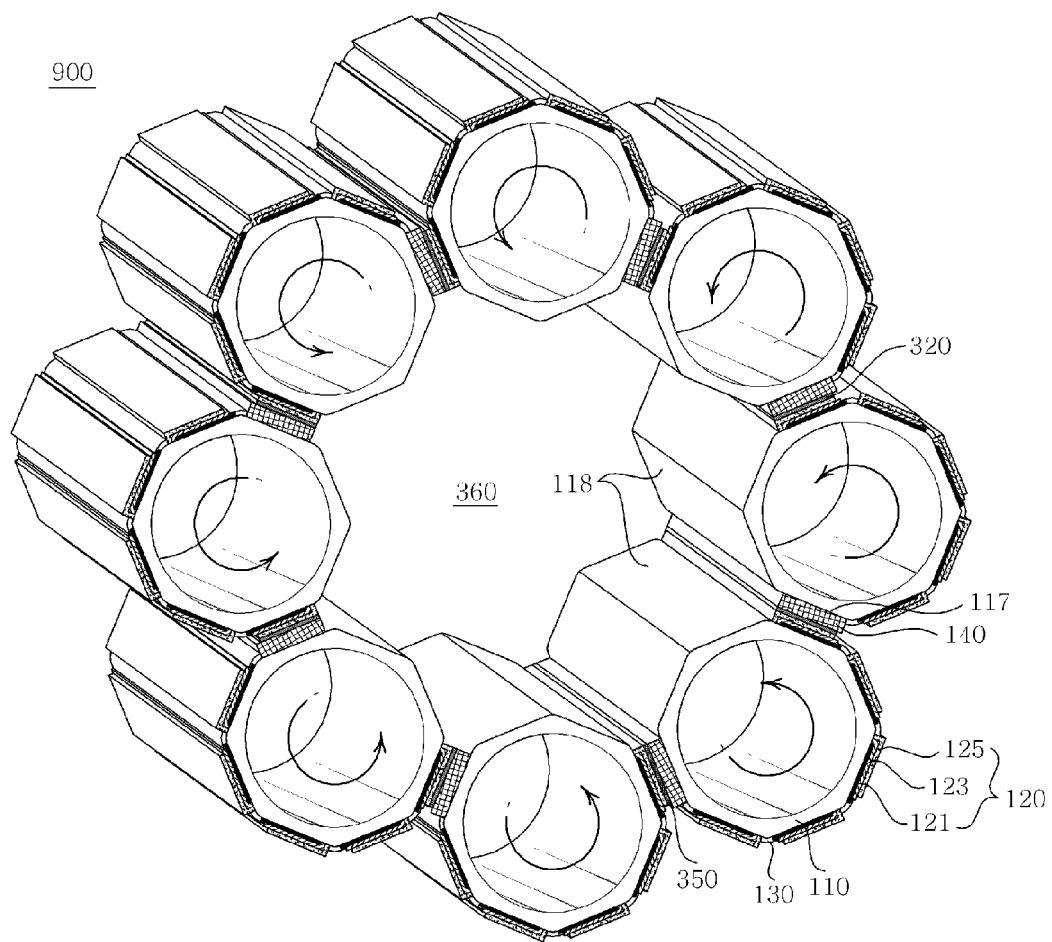
FIGS. 14 and 15 are perspective views showing SOFC bundles according to a third embodiment of the present invention.
Figure 15:
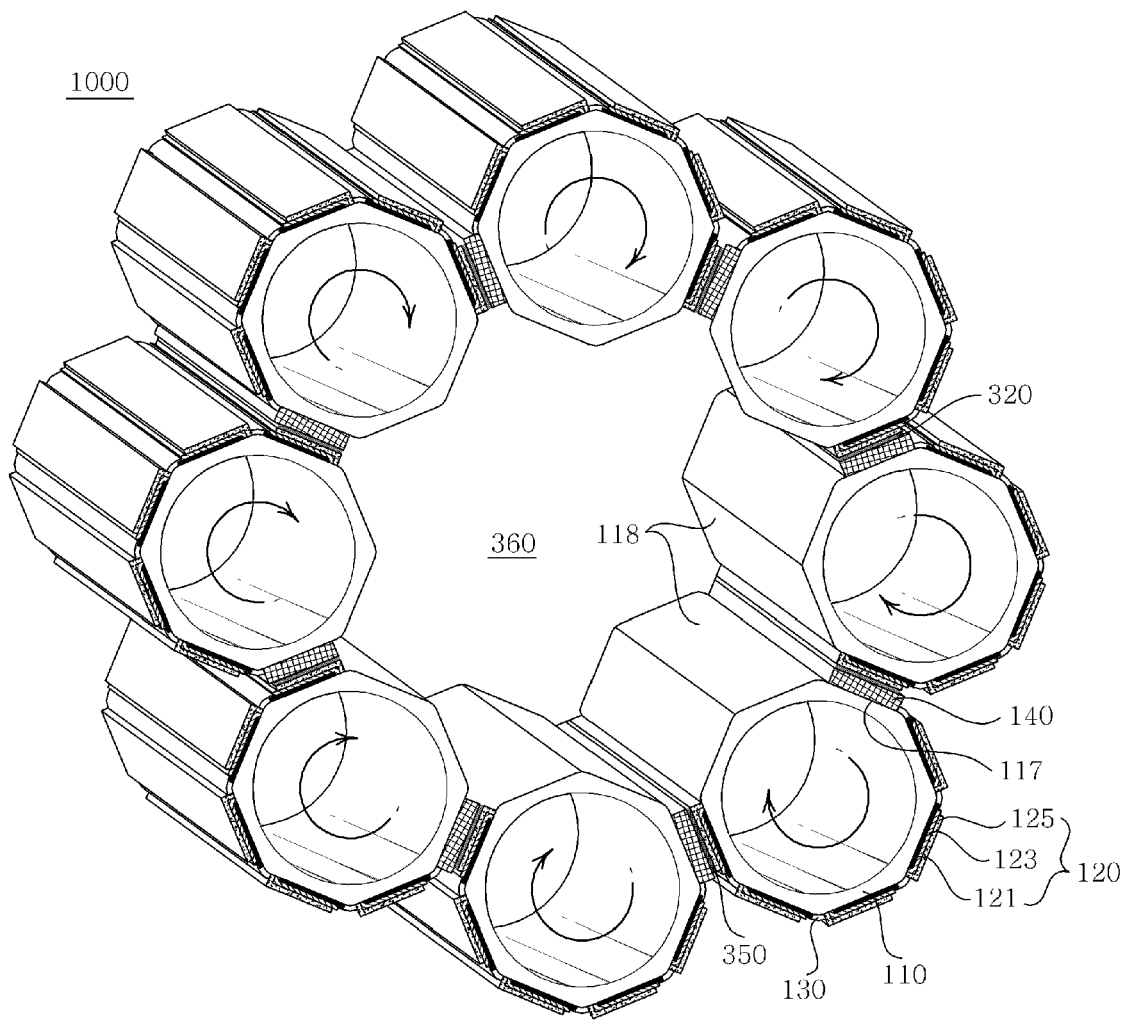

FIGS. 12 and 13 are perspective views showing SOFC bundles according to the second embodiment of the present invention, and FIGS. 14 and 15 are perspective views showing SOFC bundles according to a third embodiment of the present invention.

As shown in FIGS. 12 to 15, each of the SOFC bundles 600, 800, 900, 1000 according to the present invention includes N fuel cells each having a polygonal tubular support 110 the outer surface of which has N planes wherein N is an even number of 6 or more, an outer connector 140 formed on one plane 117 among the N planes of the tubular support, (N+2)/2 unit cells 120 respectively formed on (N+2)/2 remaining planes continuously arranged in one direction from the one plane 117 of the tubular support, and inner connectors 130 for connecting the unit cells 120 and the outer connector 140 in series. As such, in order to form a tubular hollow 360 defined by the N fuel cells, bonding between the outer connector 140 of a fuel cell and the unit cell 120 formed on the $[(N+2)/2]^{th}$ remaining plane in one direction from one plane 117 of an additional fuel cell is repeated N−1 times, thus connecting the N fuel cells in series.

The SOFC bundles 600, 800, 900, 1000 according to the present invention may be manufactured from the plurality of SOFCs 500, 700 as above. Thus, the description the same as that of the SOFCs 500, 700 is omitted, and the different portions thereof are described below.

The SOFC bundles 600, 800, 900, 1000 according to the present invention include a plurality of fuel cells which are connected in series in such a manner that the outer connector 140 of a fuel cell is bonded to the unit cell 120 of an additional fuel cell. Hence, because the plurality of fuel cells each of which has unit cells 120 connected in series is connected in series, a higher voltage may be maintained upon collection of current, thus reducing power loss due to electrical resistance.

In order to form the tubular hollow 360 defined by the plurality of fuel cells using a polygonal tubular support 110, the outer surface of the tubular support 110 geometrically has N planes in which N is an even number of 6 or more. Also, when the number of planes is N, the number of fuel cells should also be N, thus enabling the formation of the tubular hollow 360. The planes of the N fuel cells connected in series, forming the tubular hollow 360, should not be provided with the unit cells 120. As mentioned above, when the planes where the unit cells 120 are not formed are referred to as dummy planes, the number of dummy planes 118 per fuel cell may be set to (N−4)/2. The unit cells 120 are respectively formed on the (N+2)/2 remaining planes of the tubular support except for one plane 117 having the outer connector 140 formed thereon and the dummy plane 118.

Furthermore, two adjacent fuel cells are connected in series by bonding the outer connector 140 of one fuel cell thereof to the unit cell 120 (which is located farthest from the outer connector 140 in one direction) formed on the $[(N+2)/2]^{th}$ remaining plane in one direction from the one plane 117 of the other fuel cell thereof. When this bonding is repeated N−1 times, the tubular hollow 360 defined by the N fuel cells may be formed. If the above bonding is performed N times, electrical energy produced in the fuel cells cannot be actually used attributable to the series connection between the first fuel cell and the $N^{th}$ fuel cell. Hence, the bonding is performed N−1 times. As such, with the goal of stabilizing the structure of the SOFCs 600, 800, 900, 1000, it is desirable to bond the first fuel cell and the $N^{th}$ fuel cell to each other using an insulating material.

The bonding between the outer connector 140 and the unit cell 120 may be carried out using a material which is electrically conductive and porous, such as metal foam 320, metal felt or metal paste, so that an electrical connection and efficient supply of gas to the unit cells 120 are realized.

Also, in order to form the SOFC bundle having a stable structure, angles between planes forming the edges of the tubular support 110 may be equal to each other. For example, in the case of a hexagonal tubular support 110, the internal angles between the planes forming the edges may be 120°. In the case of an octagonal tubular support 110, the internal angles between the planes forming the edges may be 135°.

With reference to FIGS. 12 and 13, the SOFC bundles 600, 800 according to the present embodiment include fuel cells 500, 700 using a polygonal tubular support 110 the outer surface of which has six planes. Because of the use of the polygonal tubular support 110 having six planes, unit cells 120 are formed on four remaining planes of the tubular support except for one plane 117 having the outer connector 140 formed thereon. The SOFC bundle 600, 800 includes six fuel cells.

Specifically with reference to FIG. 12, the unit cells 120 are formed on four remaining planes continuously arranged in a counterclockwise direction from one plane 117 of the tubular support having the outer connector 140 formed thereon. Furthermore, the outer connector 140 of one fuel cell of two adjacent fuel cells 500 is bonded to the unit cell 120 formed on the fourth remaining plane in a counterclockwise direction from one plane 117 of the other fuel cell thereof, and this bonding is continuously performed five times, thus forming a tubular hollow 360 defined by six dummy planes 118. For structural stabilization of the SOFC bundle, two fuel cells which are not subjected to the above bonding may be bonded to each other using an insulating material 350. As such, current flows in a counterclockwise direction (see the arrow) based on the fuel cell 500, and also flows in a counterclockwise direction based on the SOFC bundle 600.

Specifically with reference to FIG. 13, unit cells 120 are formed on four remaining planes continuously arranged in a clockwise direction from one plane 117 of the tubular support 110 having the outer connector 140 formed thereon. Furthermore, the outer connector 140 of one fuel cell of two adjacent fuel cells 700 is bonded to the unit cell 120 formed on the fourth remaining plane in a clockwise direction from one plane 117 of the other fuel cell thereof, and this bonding is continuously conducted five times, thus forming a tubular hollow 360 defined by six dummy planes 118. For structural stabilization of the SOFC bundle, two fuel cells which are not subjected to the above bonding may be bonded to each other using an insulating material 350. As such, current flows in a clockwise direction (see the arrow) based on the fuel cell 700, and also flows in a clockwise direction based on the SOFC bundle 800.

Referring to FIGS. 14 and 15, the SOFC bundles 900, 1000 according to the present embodiment include fuel cells using a polygonal tubular support 110 the outer surface of which has eight planes. Because of the use of the polygonal tubular support 110 having eight planes, unit cells 120 are formed on five remaining planes of the tubular support except for one plane 117 having the outer connector 140 formed thereon. The SOFC bundle 900, 1000 includes eight fuel cells.

Specifically with reference to FIG. 14, the unit cells 120 are formed on the five remaining planes continuously arranged in a counterclockwise direction from one plane 117 of the tubular support having the outer connector 140 formed thereon.

The outer connector 140 of one fuel cell of two adjacent fuel cells is bonded to the unit cell 120 formed on the fifth remaining plane in a counterclockwise direction from one plane 117 of the other fuel cell thereof, and this bonding is continuously conducted seven times, thus forming a tubular hollow 360 defined by sixteen (2×8) dummy planes 118. For structural stabilization of the SOFC bundle, two fuel cells which are not subjected to the above bonding may be bonded to each other using an insulating material 350. As such, current flows in a counterclockwise direction (see the arrow) based on the fuel cell, and also flows in a counterclockwise direction based on the SOFC bundle 900.

Specifically with reference to FIG. 15, unit cells 120 are formed on five remaining planes continuously arranged in a clockwise direction from one plane 117 of the tubular support having the outer connector 140 formed thereon. Furthermore, the outer connector 140 of one fuel cell of two adjacent fuel cells 700 is bonded to the unit cell 120 formed on the fifth remaining plane in a clockwise direction from one plane 117 of the other fuel cell thereof, and this bonding is continuously performed seven times, thus forming a tubular hollow 360 defined by sixteen (2×8) dummy planes 118. For structural stabilization of the SOFC bundle, two fuel cells which are not subjected to the above bonding may be bonded to each other using an insulating material 350. As such, current flows in a clockwise direction (see the arrow) based on the fuel cell, and also flows in a clockwise direction based on the SOFC bundle 1000.

In the SOFC bundle according to the present embodiment, the number (N) of fuel cells is not limited. However, as the number (N) of fuel cells is increased, the volume of the tubular hollow 360 relative to the volume of the fuel cell is also increased. Ultimately, the use of six, eight or ten fuel cells is desirable. To this end, the tubular support 110 the outer surface of which has six, eight or ten planes may be used.

As described hereinbefore, the present invention provides an SOFC and an SOFC bundle. According to the present invention, an SOFC includes a plurality of unit cells connected in series, and an SOFC bundle includes a plurality of SOFCs connected in series, thus exhibiting excellent cell performance and high power density per unit volume, and maintaining high voltage upon collection of current to thereby effectively reduce power loss due to electrical resistance.

Also, according to the present invention, the SOFC is advantageous because electrodes and an electrolyte are formed not on the curved surface but on the plane, and thus the manufacturing process thereof becomes simplified and the manufacturing cost thereof is decreased. Furthermore, the SOFC using the tubular support eliminates a need for gas sealing, and thus manifests high long-term durability and is stable under thermal impact.

Also, according to the present invention, the outer surface of the tubular support can be manufactured in various shapes, thereby effectively manufacturing an SOFC bundle having optimal power density per unit volume.

Also, according to the present invention, the tubular support can be formed of an alumina ($Al_2O_3$)-based ceramic material, thus ensuring price competitiveness compared to a conventional tubular support.

Although the embodiments of the present invention regarding the SOFC and the SOFC bundle have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood as falling within the scope of the present invention.

What is claimed is:

1. A solid oxide fuel cell, comprising:
a polygonal tubular support an outer surface of which has a plurality of planes;
an outer connector formed on one plane of the tubular support among the plurality of planes of the tubular support;
a plurality of unit cells respectively formed on two or more remaining planes of the tubular support except for the one plane of the tubular support; and
inner connectors for connecting the plurality of unit cells and the outer connector in series,
wherein each of the plurality of unit cells comprises a first electrode, an electrolyte and a second electrode formed in sequential order on the two or more remaining planes of the tubular support except for edges of the tubular support, and
the inner connectors are formed at remaining edges of the tubular support except for an edge of the tubular support between one end of the outer connector and one end of the unit cell adjacent to the one end of the outer connector, so as to connect one end of the first electrode and one end of the second electrode adjacent to the one end of the first electrode to each other, and the one end of the first electrode and the other end of the outer connector to each other.

2. The solid oxide fuel cell as set forth in claim 1, wherein, in order to cover a lateral surface of the other end of the first electrode, an end of the electrolyte corresponding thereto extends toward the tubular support, and
the one end of the second electrode extends toward the tubular support so that the extending end of the electrolyte is covered therewith.

3. The solid oxide fuel cell as set forth in claim 1, wherein each of the inner connectors is isolated from the other end of the second electrode.

4. The solid oxide fuel cell as set forth in claim 1, wherein the first electrode is an anode, and the second electrode is a cathode.

5. The solid oxide fuel cell as set forth in claim 1, wherein the first electrode is a cathode, and the second electrode is an anode.

6. The solid oxide fuel cell as set forth in claim 1, wherein the tubular support is formed of a material being porous and having insulating properties.

7. The solid oxide fuel cell as set forth in claim 1, wherein the tubular support is formed of an alumina-based ceramic material.

8. A solid oxide fuel cell bundle, comprising:
a plurality of fuel cells, each of which comprises a polygonal tubular support an outer surface of which has a plurality of planes, an outer connector formed on one plane of the tubular support among the plurality of planes of the tubular support, a plurality of unit cells respectively formed on two or more remaining planes of the tubular support except for the one plane of the tubular support, and inner connectors for connecting the plurality of unit cells and the outer connector in series,
wherein the plurality of fuel cells is connected in series in a manner such that the outer connector of a fuel cell is bonded to a unit cell of an additional fuel cell,
wherein each of the plurality of unit cells comprises a first electrode, an electrolyte and a second electrode formed in sequential order on the two or more remaining planes the tubular support except for edges of the tubular support, and the inner connectors are formed at remaining edges of the tubular support except for an edge of the tubular support between one end of the outer connector and one end of the unit cell adjacent to the one end of the outer connector and one end of the unit cell adjacent to the one end of the outer connector, so as to connect one end of the first electrode and one end of the second electrode adjacent to the one end of the first electrode to each other, and the one end of the first electrode and the other end of the outer connector to each other.

9. The solid oxide fuel cell bundle as set forth in claim 8, wherein, in order to cover a lateral surface of the other end of the first electrode, an end of the electrolyte corresponding thereto extends toward the tubular support, and the one end of the second electrode extends toward the tubular support so that the extending end of the electrolyte is covered therewith.

10. The solid oxide fuel cell bundle as set forth in claim 8, wherein each of the inner connectors is isolated from the other end of the second electrode.

11. The solid oxide fuel cell bundle as set forth in claim 8, wherein the first electrode is an anode, and the second electrode is a cathode.

12. The solid oxide fuel cell bundle as set forth in claim 8, wherein the first electrode is a cathode, and the second electrode is an anode.

13. The solid oxide fuel cell bundle as set forth in claim 8, wherein the tubular support is a hexagonal tubular support an outer surface of which has six planes, the plurality of unit cells is respectively formed on five remaining planes of the tubular support, and the plurality of fuel cells comprises a plurality of first fuel cells each of which has an outer connector formed in a counterclockwise direction of the edge of the tubular support and a plurality of second fuel cells each of which has an outer connector formed in a clockwise direction of the edge of the tubular support, and the plurality of fuel cells is stacked in two layers by continuously performing bonding between the outer connector of a first fuel cell and the unit cell formed in a counterclockwise direction of the edge of a second fuel cell and bonding between the outer connector of the second fuel cell and the unit cell formed in a clockwise direction of the edge of an additional first fuel cell.

14. The solid oxide fuel cell bundle as set forth in claim 8, wherein the tubular support is a triangular tubular support an outer surface of which has three planes, the plurality of unit cells is respectively formed on two remaining planes of the tubular support, and the plurality of fuel cells comprises a plurality of first fuel cells each of which has an outer connector formed in a counterclockwise direction of the edge of the tubular support and a plurality of second fuel cells each of which has an outer connector formed in a clockwise direction of the edge of the tubular support, and the plurality of fuel cells is stacked in one layer by continuously performing bonding between the outer connector of a first fuel cell and the unit cell formed in a counterclockwise direction of the edge of a second fuel cell and bonding between the outer connector of the second fuel cell and the unit cell formed in a clockwise direction of the edge of an additional first fuel cell.

15. The solid oxide fuel cell bundle as set forth in claim 8, wherein the outer connector of the fuel cell is bonded to the unit cell of the additional fuel cell using metal foam, metal felt or metal paste.

16. The solid oxide fuel cell bundle as set forth in claim 8, wherein angles between the planes forming the edges of the tubular support are equal to each other.

17. A solid oxide fuel cell bundle, comprising:

a plurality of fuel cells, each of which comprises a polygonal tubular support an outer surface of which has a plurality of planes, an outer connector formed on one plane of the tubular support among the plurality of planes of the tubular support, a plurality of unit cells respectively formed on two or more remaining planes of the tubular support except for the one plane of the tubular support, and inner connectors for connecting the plurality of unit cells and the outer connector in series, wherein the plurality of fuel cells is connected in series in a manner such that the outer connector of a fuel cell is bonded to a unit cell of an additional fuel cell, wherein the tubular support has an outer surface having N planes in which N is an even number of 6 or more, the outer connector is formed on one plane of the tubular support among the N planes of the tubular support, $(N+2)/2$ unit cells are respectively formed on $(N+2)/2$ remaining planes of the tubular support continuously arranged in one direction from the one plane of the tubular support, the inner connectors are used so as to connect the unit cells and the outer connector in series, N fuel cells each of which comprises the tubular support, the outer connector and the inner connectors are provided, and bonding between the outer connector of a fuel cell and the unit cell formed on a $[(N+2)/2]^{th}$ remaining plane in one direction from one plane of an additional fuel cell is continuously performed $N-1$ times so that the N fuel cells are connected in series, in order to form a tubular hollow defined by the N fuel cells, wherein each of the $(N+2)/2$ unit cells comprises a first electrode, an electrolyte and a second electrode formed in sequential order on the $(N+2)/2$ remaining planes of the tubular support except for edges of the tubular support, and the inner connectors are used to connect one end of the first electrode and one end of the second electrode adjacent to the one end of the first electrode, which are formed at both sides of each of edges of the tubular support between the $(N+2)/2$ remaining planes on which the unit cells are formed, to each other, and to connect the one end of the first electrode to one end of the outer connector adjacent to the one end of the first electrode, which are formed at both sides of the edge of the tubular support between the one plane of the tubular support and the remaining plane adjacent to the one plane in one direction, to each other.

* * * * *